(12) United States Patent
Britton et al.

(10) Patent No.: US 8,999,007 B2
(45) Date of Patent: Apr. 7, 2015

(54) METHOD FOR FINES CONTROL

(71) Applicant: Ostara Nutrient Recovery Technologies Inc., Vancouver (CA)

(72) Inventors: Ahren Thomas Britton, Lithia, FL (US); Donald R. Clark, Lutz, FL (US); Ram Prasad Melahalli Sathyanarayana, Valrico, FL (US)

(73) Assignee: Ostara Nutrient Recovery Technologies Inc., Vancouver (CA)

( * ) Notice: Subject to any disclaimer, the term of this patent is extended or adjusted under 35 U.S.C. 154(b) by 21 days.

(21) Appl. No.: 13/941,351

(22) Filed: Jul. 12, 2013

(65) Prior Publication Data

US 2015/0017085 A1 Jan. 15, 2015

(51) Int. Cl.
*C01F 5/34* (2006.01)
*C01B 25/45* (2006.01)

(52) U.S. Cl.
CPC .................................. *C01B 25/451* (2013.01)

(58) Field of Classification Search
USPC .............................................. 23/304, 295 R
See application file for complete search history.

(56) References Cited

U.S. PATENT DOCUMENTS

| | | | |
|---|---|---|---|
| 2,209,019 A | 7/1940 | Slagh | |
| 3,419,899 A | 12/1968 | Tufts et al. | |
| 4,159,194 A | 6/1979 | Steward | |
| 4,263,010 A | 4/1981 | Randolph | |
| 4,666,527 A | 5/1987 | Ito et al. | |
| 5,124,265 A | 6/1992 | Randolph | |
| 5,663,456 A | 9/1997 | Zhang et al. | |
| 6,334,878 B1 | 1/2002 | Miyahara et al. | |
| 6,364,914 B1 | 4/2002 | Ueda et al. | |
| 6,660,049 B1 | 12/2003 | Day | |
| 6,946,572 B2 | 9/2005 | Sutradhar | |
| 7,622,047 B2 | 11/2009 | Koch et al. | |
| 7,942,939 B2 | 5/2011 | Hofmann et al. | |
| 8,245,625 B2 | 8/2012 | Winge | |
| 2012/0031849 A1 | 2/2012 | Britton | |
| 2012/0211433 A1 | 8/2012 | Ren et al. | |
| 2012/0261338 A1 | 10/2012 | Kuzma et al. | |
| 2013/0062289 A1 | 3/2013 | Cote et al. | |

FOREIGN PATENT DOCUMENTS

| | | |
|---|---|---|
| AU | 2004320909 A1 | 4/2006 |
| CA | 2552842 A1 | 8/2005 |
| WO | 9837938 A1 | 9/1998 |
| WO | 2006082341 A1 | 8/2006 |
| WO | 2012022099 A1 | 2/2012 |
| WO | 2012134255 A1 | 10/2012 |
| WO | 2013040716 A1 | 3/2013 |

OTHER PUBLICATIONS

Sotowa, A. et al., "Influence of the incomplete dissolution of fines in the fines dissolver on the optimal operation of industrial continuous DTB crystallizers", Powder Technology 121, 2001, Elsevier Science B.V., pp. 93-98.

*Primary Examiner* — Edward Johnson
(74) *Attorney, Agent, or Firm* — Oyen Wiggs Green & Mutala LLP

(57) ABSTRACT

Methods and apparatus for precipitating dissolved materials from a solution involve reduction of fines. In an embodiment, the method comprises: introducing a solution into a reactor, causing the dissolved materials in the solution to precipitate into crystals under a first reaction condition, adjusting the reaction condition from the first reaction condition to a second reaction condition, maintaining the reaction condition in the second reaction condition to cause a sub-population of the crystals to dissolve, and adjusting the reaction condition from the second reaction condition to the first reaction condition. In an embodiment, the apparatus comprises a reaction tank, a recycling path and at least an acid injector which is configured for dosing an acid into solution flow in the recycling path.

21 Claims, 14 Drawing Sheets

METHOD FOR FINES CONTROL

TECHNICAL FIELD

The invention relates to reactor apparatus and methods for precipitating dissolved materials. Some embodiments provide methods and apparatus for crystallizing materials such as struvite from aqueous solutions such as wastewater or process water. For example, some embodiments relate to reactor apparatus and methods for precipitating dissolved materials to form crystals and for controlling fines.

BACKGROUND

Reactors in general and fluidized bed reactors in particular have been used to remove and recover phosphorous from solutions such as wastewater and process water. Aqueous solutions from some sources contains significant concentrations of phosphorus, often in the form of phosphate. Such aqueous solutions may come from a wide range of sources. These include sources such as leaching from landfill sites, runoff from agricultural land, effluent from industrial processes, industrial process water, municipal wastewater, animal wastes, phosphogypsum pond water, and the like. Such aqueous solutions, if released into the environment without treatment, can result in excess phosphorus levels in the receiving waters.

Various phosphorus removal and recovery technologies exist. Some of the technologies provide fluidized bed reactors for removing phosphorus from aqueous solutions by producing struvite ($MgNH_4PO_4.6H_2O$) or struvite analogs or other phosphate compounds in the form of crystals. Struvite can be formed by the reaction:

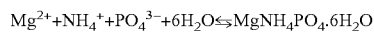

$$Mg^{2+}+NH_4^++PO_4^{3-}+6H_2O \leftrightarrows MgNH_4PO_4.6H_2O$$

Koch et al., fluidized bed wastewater treatment, U.S. Pat. No. 7,622,047, describes example reactors and methods that may be applied to remove and recover phosphorus from aqueous solutions.

A difficulty sometimes exhibited in crystallization reactions is that the sizes of particles produced by the reaction may not be as desired. For example, under certain operating conditions, a reactor may produce very tiny crystals ("fines") where larger crystals are desired. Crystal sizes are affected by a wide range of factors including flow conditions, chemical composition, temperature etc.

References that describe various crystallization processes include: U.S. Pat. Nos. 8,245,625; 7,942,939; WO2006082341; U.S. Pat. Nos. 6,946,572; 6,364,914; WO9837938; U.S. Pat. Nos. 4,666,527; 3,419,899; 2,209,019; 4,159,194; 4,263,010; 5,124,265; 6,660,049; 5,663,456; AU2004320909; WO2012022099; WO2012134255.

There remains a need for effective apparatus and methods for removing and recovering dissolved materials from solutions. There remains a particular need for effective methods and apparatus suited to making large particles of marginally soluble substances such as struvite, struvite analogs and calcium phosphate.

SUMMARY OF THE INVENTION

Aspects of the present invention relate to reactor apparatus and methods for precipitating dissolved materials. The apparatus and methods have example application to growing crystals of materials such as struvite, struvite analogs, and calcium phosphate.

Apparatus and methods according to some embodiments operate to destroy fines by altering a pH of a solution or liquor from which the crystals are being grown. The pH may be altered in a direction such that the fines are rendered more soluble and therefore dissolve. The fines, which have large ratios of surface area to volume as compared to larger particles may dissolve at a high rate while larger particles are relatively unaffected. In various embodiments the conditions for destroying fines are established periodically in an entire reactor or a part thereof and/or are maintained in a fines destruct zone through which fluid containing fines is circulated (either periodically or continuously). By maintaining a low concentration of fines, growth rates of larger particles may be enhanced.

Some aspects of the invention provide methods in which a reactor is operated under high growth conditions accompanied by a high rate of nucleation of fines. For example, the high growth conditions may correspond to supersaturated conditions for a substance being produced. In some embodiments a supersaturation ratio (ratio of the product of concentrations of constituents of the substance to the product of concentrations corresponding to equilibrium) is above a threshold to achieve a high growth rate of crystals. For example, in some embodiments, the supersaturation ratio for struvite or another material being crystallized may be 2 or more or 3 or more or 5 or more in the reactor. In some embodiments the substance is sparingly soluble. Concentration of fines may be maintained below a threshold, thereby maintaining a growth rate of larger particles, by periodically or continuously destroying fines as described herein.

One aspect of the invention (Aspect 1) provides methods for precipitating dissolved materials from a solution. The methods comprise (a) introducing the solution containing the dissolved materials into a reactor, (b) causing the dissolved materials in the solution to precipitate into crystals under first reaction conditions, (c) adjusting the reaction condition in the reactor or in a portion of the reactor from the first reaction conditions to second reaction conditions, (d) maintaining the second reaction conditions in the reactor or in a portion of the reactor for a period of time sufficient to cause a sub-population of the crystals to dissolve, and (e) adjusting the reaction condition in the reactor or in a portion of the reactor from the second reaction conditions to the first reaction conditions.

Aspect 2: Methods according to aspect 1, wherein the first reaction condition is a reaction condition wherein the rate of dissolved materials in the solution precipitating into crystals ($R_{forward}$) is greater than the rate of crystals dissolving into solution ($R_{reverse}$), and wherein the second reaction condition is a reaction condition wherein the rate of dissolved materials in the solution precipitating into crystals ($R_{forward}$) is less than the rate of crystals dissolving into solution ($R_{reverse}$).

Aspect 3: The method according to aspect 1 or 2, wherein steps (b) to (e) are repeated in cycles.

Aspect 4: The method according to any one of aspects 1 to 3, wherein step (c) comprises decreasing the pH of the solution in the reactor or in a portion of the reactor to below an equilibrium pH.

Aspect 5: The method according to aspects 4, wherein decreasing the pH of the solution in the reactor or in a portion of the reactor to below an equilibrium pH in step (c) comprises dosing an acid into the solution.

Aspect 6: The method according to aspect 5, wherein the acid comprises one or more of sulfuric acid, nitric acid, phosphoric acid, acetic acid, citric acid, hydrochloric acid, acetic acid, and carbon dioxide. In some embodiments the acid comprises carbon dioxide (carbonic acid) and (e) adjusting the reaction condition in the reactor or in a portion of the reactor from the second reaction conditions to the first reaction conditions comprises air stripping and/or bubbling air or another gas such as nitrogen to remove carbon dioxide from solution.

Aspect 7: The method according to aspect 5 or 6, wherein the acid is dosed to a recycling path of the reactor.

Aspect 8: The method according to any one of aspects 1 to 7, wherein step (c) comprises decreasing the pH of the solution in the reactor or in a portion of the reactor. In some embodiments the pH is reduced by 0.05 to 1.0 pH units from the first reaction condition to the second reaction condition.

Aspect 9: The method according to any one of aspects 1 to 7, wherein step (c) comprises decreasing the pH of the solution in the reactor or in a portion of the reactor by 0.1 to 0.5 pH units from the first reaction condition to the second reaction condition.

Aspect 10: The method according to aspect 9, wherein step (c) comprises decreasing the pH of the solution in the reactor or in a portion of the reactor by 0.2 to 0.5 pH units from the first reaction condition to the second reaction condition within 5 to 30 minutes.

Aspect 11: The method according to aspect 10, wherein step (c) comprises decreasing the pH of the solution in the reactor or in a portion of the reactor by 0.2 to 0.5 pH units from the first reaction condition to the second reaction condition within less than 5 minutes.

Aspect 12: The method according to aspect 11, wherein step (c) comprises decreasing the pH of the solution in the reactor or in a portion of the reactor by 0.2 to 0.5 from the first reaction condition to the second reaction condition within less than 30 seconds.

Aspect 13: The method according to any one of aspects 1 to 8, wherein step (c) comprises decreasing the pH of the solution in the reactor or in a portion of the reactor to a level which is sufficient to increase the solubility of the crystals by at least 10%.

Aspect 14: The method according to aspect 13, wherein step (c) comprises decreasing the pH of the solution in the reactor or in a portion of the reactor to a level which is sufficient to increase the solubility of the crystals by at least 50%.

Aspect 15: The method according to any one of aspect 1 to 14, wherein step (e) comprises increasing the pH of the solution to above an equilibrium pH.

Aspect 16: The method according to aspect 15, wherein increasing the pH of the solution to above an equilibrium pH in step (e) comprises dosing a base to the solution.

Aspect 17: The method according to any one of aspects 1 to 16, wherein the reaction condition is switched between the first reaction condition and the second reaction condition automatically based on a timer.

Aspects 18: The method according to any one of aspects 1 to 16, wherein the reaction condition is switched between the first reaction condition and the second reaction condition automatically based on an online or offline measurement of a parameter of the solution in the reactor or in a portion of the reactor.

Aspect 19: The method according to aspect 18, wherein the parameter measured is turbidity.

Aspect 20: The method according to aspect 19, wherein the reaction condition is automatically switched from the first reaction condition to the second reaction condition when the measured turbidity increases to a level between 50 to 200 NTU, and wherein the reaction condition is automatically switched from the second reaction condition to the first reaction condition when the measured turbidity decreases to a level below 50 NTU.

Aspect 21: The method according to any one of aspects 1 to 20, wherein the sub-population of the crystals dissolved in step (d) comprise fine crystals having a diameter of less than 100 microns.

Aspect 22: Another aspect provides reactors for precipitating dissolved materials from a solution. The reactors comprise: a reaction tank having an inlet and an outlet, a recycling path which is connected to take solution from one location in the reaction tank and to return the solution to another location in the reaction tank. The recycling path may be internal to the reaction tank or external to the reaction tank. Some embodiments provide a plurality of recycling paths. One or more of the recycling paths may take fluid from a higher elevation within the reaction tank (the higher elevation, in some embodiments, is above a zone into which larger particles are size segregated and within a zone into which fines are present). In some embodiments the one or more recycling paths return recycled fluid into the reactor tank at a location below the zone where the larger particles are size segregated. An acid injector is configured to controllably dose an acid into solution flowing in the recycling path.

Aspect 23: The reactor according to aspect 22, wherein the reactor comprises a controller configured to control injection of acid (timing and/or rate of injection) of the acid injector.

Aspect 24: The reactor according to aspect 23, wherein the reactor comprises a timer operatively connected to the controller.

Aspect 25: The reactor according to aspect 24, wherein the reactor comprises a measuring device for measuring a parameter of the solution in the reaction tank or in the recycling path and the measuring device is operatively connected to the controller.

Aspect 26: The reactor according to any one of aspects 22 to 25, wherein the reactor comprises a base injector which is configured for controllably dosing a base into solution flow in the reactor and/or in the recycling path and/or into a flow of feedstock entering the reactor.

Aspect 27: The reactor according to aspect 26, wherein the base injector is located in the recycle path downstream of the acid injector.

Aspect 28: The reactor according to any one of aspects 22 to 27, wherein the recycling path comprises a fines treatment tank. In some embodiments the fines treatment time has a volume such that a residence time in the fines treatment tank is at least 10 seconds (at least 20 seconds or at least 30 seconds in some embodiments).

Aspects 29: The reactor according to aspect 28, wherein the recycling path comprises a solids separation device configured to separate solids (e.g. fines) from the liquid in the recycling path.

Aspect 30: The reactor according to aspect 29, wherein the reactor comprises a bypass path connecting the solids separation device to a point downstream of the fines treatment tank for sending clarified liquid from the solids separation device to a point downstream of the fines treatment tank.

Aspect 31: The reactor according to any one of aspects 22 to 30, wherein the recycling path has a retention time of more than 30 seconds.

Aspect 32: The reactor according to any one of aspects 22 to 30, wherein the recycling path has a retention time of less than 30 seconds.

Further aspects of the invention and features of various example embodiments of the invention are described below.

BRIEF DESCRIPTION OF THE DRAWINGS

The accompanying drawings illustrate non-limiting embodiments of the invention.

DESCRIPTION

Throughout the following description, specific details are set forth in order to provide a more thorough understanding of the invention. However, the invention may be practiced without these particulars. In other instances, well-known elements have not been shown or described in detail to avoid unnecessarily obscuring the invention. Accordingly, the specification and drawings are to be regarded in an illustrative, rather than a restrictive, sense.

This invention relates to the crystallization of materials from solution. Embodiments provide crystallization reactors and methods as well as apparatus and methods for reducing the concentration of fines in crystallization reactors. Other embodiments provide methods and apparatus for growing crystals of materials that have poor solubility (of which struvite, struvite analogs and calcium phosphate are examples). Some specific embodiments provide fluidized bed-type crystallization reactors in which crystals and precipitated materials are supported by flowing solution (although the invention also has application to crystallization reactors of other types). The invention may be applied to controlling fines in the crystallization of any of a wide range of chemical substances from solution. Precipitation of struvite from aqueous solutions is used in this disclosure as a non-limiting example embodiment of the invention.

Some embodiments of the invention in the following description relate to reactor apparatus or methods wherein phosphorus in aqueous solutions is precipitated in the form of struvite or struvite analogs or other phosphate compounds. This choice of example coincides with an aspect of the invention having significant commercial utility. The scope of the invention, however, is not limited to these examples.

The term "aqueous solution" or "solution" is used in the following description and claims to include aqueous solutions such as industrial and municipal wastewater, industrial process water, leachate, runoff, animal wastes, effluent, phospho-gypsum pond water, or the like. Some embodiments provide methods for treating municipal sewage and/or animal waste. Some embodiments provide methods and apparatus for treating other kinds of wastewater. Some embodiments provide methods and apparatus for crystallizing materials using feedstock other than wastewater.

Figure 1:
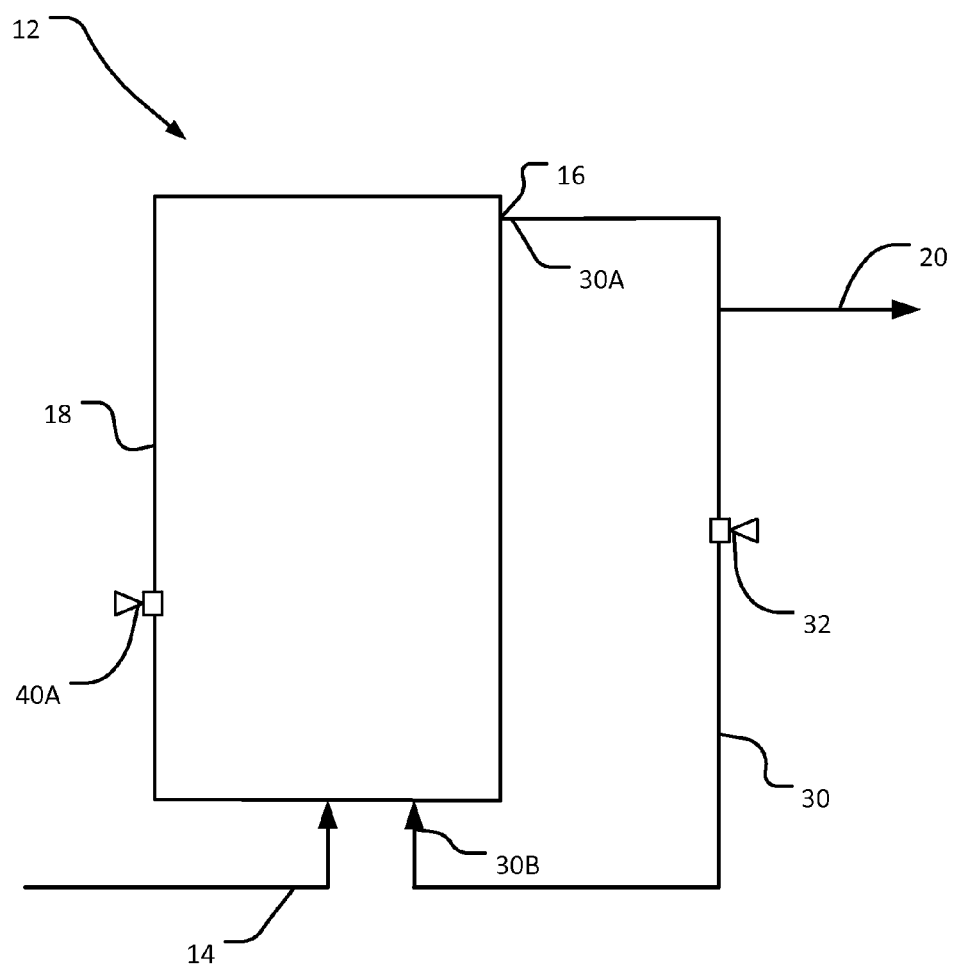
FIGS. 1 to 1H are schematic diagrams of various example reactor apparatus according to some embodiments of the invention.

One aspect of the invention provides an apparatus for precipitating dissolved materials from solutions. The apparatus comprises a reactor. For example, the reactor may comprise a fluidized bed reactor. FIG. 1 shows a reactor 12 according to an example embodiment of the invention.

Reactor 12 comprises an inlet 14, an outlet 16 and a reaction tank 18. A feedstock solution is introduced to reaction tank 18 via inlet 14. Inlet 14 is below outlet 16. Tank 18 is constructed so that the flow of feedstock solution in reactor 12 is generally upward. Crystals that may form in reactor 12 will be urged upwardly and against the force of gravity by fluid flow in reactor 12. Where the flow rate decreases with elevation in tank 18 crystals will tend to become classified by size with larger crystals tending to be located in lower parts of tank 18 and smaller crystals tending to be higher up in tank 18.

Reactor 12 also comprises a recycling path 30. Not all fluidized bed reactors have a recycling path. However, a recycling path 30 can be advantageous as it provides a way to adjust fluid flow rates within reactor 12 without changing the rate at which feedstock solution is introduced into reaction tank 18 at inlet 14. Recycling path 30 is connected to receive or withdraw solution from reaction tank 18 and to return solution to reaction tank 18. Reactors according to some embodiments may provide a plurality of recycling paths 30.

The illustrated recycling path 30 has an inlet end 30A and an outlet end 30B. Recycling path 30 preferably has a size that provides at least 10 seconds (e.g., 15 seconds, 20 seconds, 30 seconds, or more than 30 seconds, in some embodiments) of retention time for solution flow. In the FIG. 1 embodiment, outlet 16 connects to inlet end 30A of recycling path 30, although in other embodiments, inlet end 30A of recycling path 30 can be separate from outlet 16. Outlet 16 may connect to an effluent piping system 20. Inlet 14, outlet 16, recycling path 30, and effluent piping system 20 each comprise one or more valves (not specifically indicated in the drawing) which allow them to be turned on or off.

In some embodiments, a plurality of recycling paths are provided. The recycling paths may include paths that withdraw fluid at a number of different elevations in tank 18. In some embodiments, a recycle manifold draws fluid from a plurality of locations across the cross-section of tank 18. For example, the recycle manifold may include a plurality of headers extending within tank 18. Each of the headers may draw fluid from tank 18 through a number, in some embodiments a large number, of openings. In some embodiments, recycle fluid is combined into a single conduit which carries the recycle fluid to a point where it is reintroduced near the bottom of tank 18. The recycle fluid may be released into tank 18 at a separate port (which is directed vertically upward in some embodiments) or may be mixed with incoming feedstock before entering tank 18.

The feedstock solution (wastewater in some embodiments) flows into reaction tank 18 through inlet 14 and flows out of reaction tank 18 through outlet 16. In some embodiments, reactor 12 comprises a plurality of inlets and/or outlets.

Inlet 14 may be located, for example, in or near the lower portion of reaction tank 18. Outlet 16 may be located, for example, in or near the upper portion of reaction tank 18. In some embodiments inlet 14 is directed upwardly and flow of solution introduced from inlet 14 into reaction tank 18 is directed upwardly.

Under the right reaction conditions, crystals (e.g., crystals of struvite or other phosphorus-containing compounds in some embodiments) form in reaction tank 18 through precipitation of dissolved materials in the solution (e.g., wastewater solution in some embodiments). Crystals may grow larger over time and may be sorted according to size by differences in fluid velocities in different regions within the reaction tank. For example, in some embodiments fluid flows upward in the reaction tank with a velocity that increases with depth in the reaction tank (decreases with elevation). This may be achieved, for example, by providing a reaction tank having a cross sectional area that increases with elevation above the inlet and/or by providing recycling paths having outlets at different depths in reaction tank 18.

In such embodiments crystals may move downward as they grow in size (e.g., through accretion and/or aggregation with other crystals). The crystals may ultimately enter a harvesting zone in reaction tank 18 from which they may be removed for use as fertilizer or other applications.

As discussed above, recycling path 30 is connected to withdraw solution from reaction tank 18 and to return solution to reaction tank 18. In some embodiments, recycling path 30 returns solution to reaction tank 18 below a location at which the solution is received from reaction tank 18. In some embodiments, recycling path 30 shares inlet 14 and/or outlet 16 (e.g., inlet end 30A of recycling path 30 is in direct fluid communication with outlet 16, and/or outlet end 30B of recycling path 30 is in direct fluid communication with inlet 14). In other embodiments, recycling path 30 has one or more inlet ends separate from outlet 16 and/or one or more outlet ends into reaction tank 18 separate from inlet 14.

In some embodiments, it is possible to increase the upward fluid velocity in reaction tank 18 for a given flow rate of feedstock solution at inlet 14 by increasing the flow rate in recycling path 30. In embodiments in which flow in recycling path 30 is controllable (e.g. by controlling a valve and/or controlling a pump to alter the flow rate) the variable flow rate in recycling path 30 may be controlled on its own and/or in combination with controlling the rate of infeed of feedstock solution to maintain desired fluid velocities within reaction tank 18.

In some embodiments the recycling path may be internal to the reactor, for example in the case of a draft tube reactor. In some embodiments the recycling path may be virtual in that the recycling is effected by a mixer internal to the reactor which induces a circulating fluid flow pattern within the reactor resulting in re-circulation of reactor liquor within reaction tank 18.

In some embodiments, reaction tank 18 comprises a substantially vertically-oriented conduit having a harvesting section and two or more vertically-sequential sections above the harvesting section. A cross-sectional area of the conduit may increase moving from the bottom of reaction tank 18 toward the top of reaction tank 18. For example, the cross sectional area may increase between adjacent ones of the sections. The number of sections in the conduit may be varied. In some embodiments the cross-sectional area increases stepwise. In some embodiments the cross-sectional area increases smoothly. In some embodiments, reaction tank 18 is cone-shaped or horn-shaped or otherwise configured to have a cross-sectional area that increases smoothly with elevation above the bottom of reaction tank 18. Tank 18 may be round in cross-section but is not necessarily so). Inlet 14 may be located in or below the harvesting section for example.

Some embodiments of the present invention may comprise a fluidized bed reactor of the type described in Koch et al., U.S. Pat. No. 7,622,047, entitled "Fluidized Bed Wastewater Treatment", which is hereby incorporated herein by reference in its entirety for all purposes.

The inventors have determined that, in some applications, it is desirable to be able to maintain control of the size of the product crystals (e.g., crystals of struvite or other phosphorus-containing compounds) which form in the reactor through precipitation of dissolved materials. For example, it may be desirable to selectively precipitate and harvest large product crystals (e.g., crystals with a diameter 1 mm).

One aspect of the invention relates to crystallization apparatus and methods which provide for the control of fines (fines are very small crystals, for example crystals with a diameter≤100 micron may be described as "fines") in a reactor. Many fines in a reactor may have sizes in the range of about 1 µm to about 10 µm.

Fines can have an extremely large ratio of surface area to mass as compared to larger crystals. Where a large number of fines are present in a crystallization reactor, a high proportion of crystal growth can occur on the surface of fines thereby reducing the growth rates of larger crystals. The inventors have realized that fines production in a reactor can result from zones of high supersaturation (exceeding metastable limits and resulting in primary or secondary nucleation) or from attrition of previously formed crystals within the reactor. One could reduce production of fines by operating a reactor with very low supersaturation. However crystals may grow slowly under such conditions. It is desirable to be able to control the accumulation of fines within the reactor, especially when large (e.g., ≥1 mm) product crystal sizes are desired.

During struvite crystallizer operation, and especially when operating with feedstock solutions with high concentration of phosphate (>100 mg/L $PO_4$—P feedstocks and particularly >2000 mg/L $PO_4$—P), and/or extended hydraulic retention times in the reactor (>1 hrs and particularly >12 hrs) it has been found that fines (crystals with a diameter<100 micron) tend to accumulate in the reactor. In some cases, within a period of 6 to 12 hours of operation almost all the crystal formation/growth may occur as fines, either through primary/secondary nucleation, or due to growth occurring primarily on the surface of existing fines retained in the reactor. It is believed that this phenomenon can occur as a result of a combination of increased secondary nucleation in the presence of high levels of fines combined with the overwhelming majority of the crystal surface area in the reactor being on the surface of fines (which have much higher surface area to volume ratios than larger and more desirable crystals with diameters of e.g. 1-5 mm).

The rate at which fines accumulate may be controlled to a certain extent (and the period before which runaway fines production begins could be extended) by reducing the crystallization reaction rate and/or supersaturation ratio. However, if significant amounts of fines (e.g., >5 ml/L settled fines as measured in the reactor recycling path flow, or turbidity>500 NTU) were present in the reactor, further increase in crystal size distribution or growth of large crystals may be significantly impaired by the presence of fines.

Figure 2:
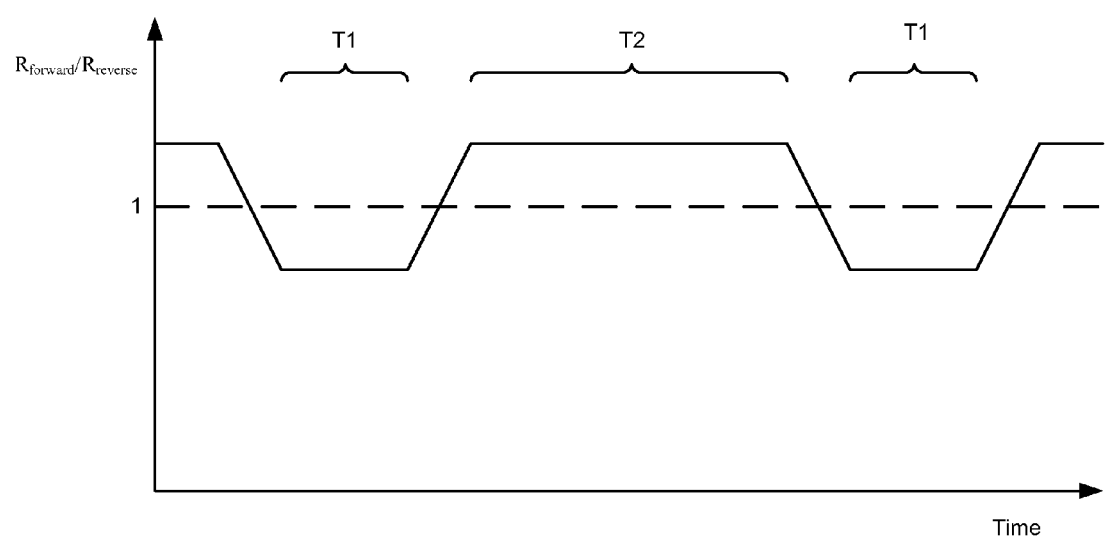
FIG. 2 is a schematic graph of a function of the ratio of $R_{forward}/R_{reverse}$ of a reaction over time, according to an example embodiment of the invention.

Accordingly, one aspect of the invention provides apparatus and methods which comprise a component or a step of temporarily adjusting the reaction conditions in the reactor or in a portion of the reactor (e.g., in a recycling path) to change the dynamics of the reversible precipitation reaction such that the rate of crystals dissolving into solution ($R_{reverse}$) is temporarily greater than the rate of dissolved species in the solution precipitating into crystals ($R_{forward}$). For example, the apparatus and methods may operate by causing conditions in the reactor or in a portion of the reactor to alternate between a first phase wherein $R_{reverse}$ is greater than $R_{forward}$ and a second phase wherein $R_{reverse}$ is less than $R_{forward}$. This is schematically illustrated in FIG. 2, which is a schematic graph of a function of the ratio of $R_{forward}/R_{reverse}$ over time. (When $R_{forward}/R_{reverse}$ equals 1, the reaction is in dynamic equilibrium.) For example, over time, the reaction condition fluctuates between the first phase and the second phase and may be controlled to stay in the first phase for a period of time (T1) to dissolve the fines and to stay in the second phase for another period of time (T2) to grow the larger crystals.

In some other embodiments, fines destruction is accomplished by having a fines destruct zone in the reactor (for example in a recycling path or in an upper portion of the reactor) where the reaction conditions are continuously or semi-continuously maintained such that $R_{reverse}$ is greater than $R_{forward}$, while the conditions in the remainder of the reactor are maintained such that $R_{forward}$ is greater than $R_{reverse}$. In such embodiments, fluid from the reactor may be circulated through the fines destruct zone to dissolve fines.

For example, where solubility of a substance being precipitated is pH-dependent, the apparatus and methods may comprise a component or a step of temporarily decreasing the pH of the solution in the reactor or in a portion of the reactor to change the dynamics of the reversible precipitation reaction such that the rate of crystals dissolving into solution ($R_{reverse}$) is temporarily greater than the rate of dissolved species in the solution precipitating into crystals ($R_{forward}$).

In other embodiments the apparatus and methods may comprise a component or a step of temporarily removing fluid containing fines from the reactor, transporting the fluid to a fines destruct zone in which the rate of crystals dissolving into solution ($R_{reverse}$) is greater than the rate of dissolved species in the solution precipitating into crystals ($R_{forward}$) and then returning the solution containing the dissolved fines into the reactor. In some such embodiments, the fluid may be taken from a part of the reactor in which fines tend to collect. In some such embodiments the fluid may be returned to the reactor via an opening in a lower part of the reactor and/or mixed with incoming feedstock before being reintroduced into the reactor.

Solubility of a precipitated substance may be defined by its solubility product, or its Ksp. Where the solubility product is defined as the product of the ion activities of the various molecules that make up the crystal at equilibrium. For example the Ksp for struvite would be defined by Ksp= $\{Mg^{2+}\}\{NH_4^+\}\{PO_4^{3-}\}$ where $\{\}$ is the molar ion activity for the component at equilibrium.

In a reversible crystallization reaction, when other factors such as temperature, pressure and supersaturation ratio are unchanged, the reversible crystallization reaction may reach a dynamic equilibrium (i.e., when $R_{forward}=R_{reverse}$) at a certain pH. This pH point is described herein as the "equilibrium pH". When the pH of the solution is higher than the equilibrium pH, $R_{forward}$ is greater than $R_{reverse}$, and the net reaction is the precipitation of the dissolved species into crystals. When the pH of the solution is lower than the equilibrium pH, $R_{forward}$ is less than $R_{reverse}$, and the net reaction is that the crystals dissolve into solution. Since fines are very small and have high ratios of surface area to volume, the fines can be dissolved in a relatively short period of time during which larger crystals may lose only a very small portion of their mass.

Figure 3:
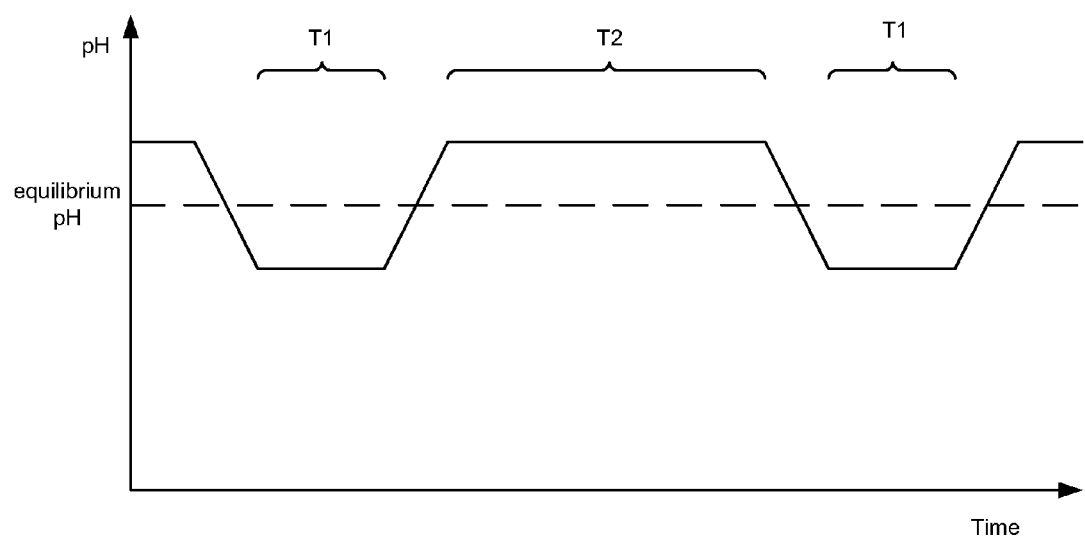
FIG. 3 is a schematic graph of a function of the pH of a reaction over time, according to an example embodiment of the invention.

The apparatus and methods may comprise a component or a step of temporarily decreasing the pH of the solution in the reactor or in a portion of the reactor to a level below the equilibrium pH. For example, the apparatus and methods may comprise fluctuating the reaction conditions in the reactor or in a portion of the reactor between a first pH phase wherein the pH is lower than the equilibrium pH and a second pH phase wherein the pH is higher than the equilibrium pH. This is schematically illustrated in FIG. 3, which is a schematic function of pH over time. For example, over time, the reaction conditions fluctuate between the first pH phase and the second pH phase and may be controlled to stay in the first pH phase for a period of time (T1) to dissolve the fines and to stay in the second pH phase for another period of time (T2) to grow larger crystals.

In some embodiments, providing a fines destruct phase (T1) facilitates operation in the crystal-growing phase (T2) under conditions which would otherwise be unusable because of the high nucleation rate for fines which would relatively quickly result in a high concentration of fines in the reactor. For example, in some embodiments, the crystal-growing phase (T2) comprises conditions which, within 12 hours, would result in substantial cessation of the growth of larger particles (e.g. the growth rate of larger particles would drop by 90% or more over the 12 hour period due to the accumulation of fines). By periodically operating the reactor in a fines destruct phase (T1) under conditions that destroy fines, as described herein, the fines may be kept at a suitably low level (e.g. at a level not exceeding 5 ml/liter of settled fines) while benefiting from the increased crystal growth rate due to more aggressive crystallization conditions in the crystal growing phase (T2). The presence of fines can tend to stimulate the nucleation of more fines. Therefore, keeping the concentration of fines low in a reactor can reduce a nucleation rate for fines in some embodiments even if other conditions are unchanged.

For example, in fines destruct phase (T1) the pH may be decreased by adding an acid to the solution. After the fines destruct phase, the pH may be increased by ceasing to add the acid and/or neutralizing the acid and/or adding a base to the solution. The periodical or cyclical decrease and/or increase of the pH in the reactor or in a portion of the reactor can be triggered by factors such as time or turbidity, either manually or automatically based on measurement of time or turbidity or some other factors or a combination thereof.

The inventors have empirically determined that when decreasing the pH of the solution (e.g., to change reaction conditions such that the pH of the solution is lower than the equilibrium pH), a more rapid pH decrease (i.e. more rapid rates of acid addition over a short period (e.g., pH decrease of 0.2-0.5 over 5-30 minutes) or "shock" addition of acid may be more effective than a "maintenance" dose of acid that is more gradually applied. The inventors have found a similar although less significant effect for the pH increase when adding a base to bring the reaction condition back to a phase wherein the pH of the solution is higher than the equilibrium pH.

In some embodiments, the pH range suitable for precipitating and growing crystals of a desired substance—e.g. struvite or a struvite analog—is in the range of about pH 6.5 to about pH 9. Therefore, the pH in the second pH phase (T2) is typically maintained at a level within the range of 6.5 to 9 (e.g., between 7.0 and 8.5). In some embodiments, the pH in the first fines destruct phase (T1) is decreased by 0.1 to 0.5 (e.g., 0.1-0.2, or 0.2-0.3, or 0.3-0.4, or 0.4-0.5) as compared to the pH in the second crystal-growing phase (T2). In some embodiments, the pH in the first pH phase (T1) is decreased to a level which is sufficient to increase the solubility of the crystals by at least 10% (e.g., 10% to 100%, or more than 100%) as compared to the second pH phase (T2).

The apparatus and methods may comprise a component or a step of controllably applying an acid to the reactor (or a portion of the reactor) to reduce the pH of the solution in order to dissolve the fines in the reactor (or the portion of the reactor). The term "acid" herein includes a substance which increases the concentration of hydronium ions ($H^3O^+$) in the solution and/or reduces the pH of the solution. The term "acid" herein includes, without limitation, sulfuric acid, nitric acid, phosphoric acid, acetic acid, hydrochloric acid, citric acid, and carbon dioxide.

An example apparatus according one aspect of the invention is schematically illustrated in FIG. 1. In FIG. 1, reactor 12 comprises recycling path 30. Recycling path 30 comprises an acid injector 32. Injector 32 may be used to apply an acid to the solution flow in recycling path 30. This in turn lowers the pH of the solution in recycling path 30 or in reactor 12 as a whole. In this way recycling path 30 with acid injector 32 may act as a fines destruct loop, selectively dissolving fines that are small enough to be held in suspension in the reactor recycling path flow. Most of the larger crystals remain in reaction tank 18 (e.g., in the fluidized bed in the reaction tank).

In some embodiments, most of the larger crystals are not directly exposed to the acid dose or reduced pH until the fines have had a chance to be dissolved in recycling path 30. In some embodiments, acid injector 32 injects acid near the beginning of recycling path 30. For example, acid injector 32 may be located to inject acid into a location in the first ½, or ⅓, or ¼, or ⅕, or ⅒ of recycling path 30.

In some other embodiments, the acid applied in recycling path 30 may lower the pH not only in recycling path 30, but also in reaction tank 18. It is possible that the reduction of pH locally in recycling path 30 may be greater than the reduction of pH in reaction tank 18 which is further away from acid injector 32. Because the fines have a high surface area to volume ratio relative to the larger crystals, the fines have a tendency to dissolve faster on a % mass basis than the larger crystals. In some embodiments, pH is increased in the recycling path (e.g. by neutralizing the acid by injecting a base) before the recycling path rejoins tank 18.

Although only a single recycling path 30 is schematically shown in the drawing, it should be noted that in some embodiments, reactor 12 may comprise a plurality of recycling paths or pipes. In some embodiments, an acid injector 32 is provided in a plurality of or in all of the plurality of recycling paths 30. In some embodiments, the recycling path comprises a recycling manifold which draws from one or a plurality of headers. The flow may be reintroduced into the reaction tank through one or more nozzles. For example, flow from several headers may be combine into a single pipe that carries the solution to be reintroduced vertically upwards from at or near the bottom of the reaction tank. For example, the plurality of headers may be located at a single level, and extend across the cross section of the reaction tank. Each header may comprise a plurality of drawoff points/perforations. For example, an acid injector 32 may be provided in a plurality or in all of the plurality of headers.

In some embodiments, reaction tank 18 may comprise a base injector which injects a base (e.g., a substance which increases the concentration of OH$^-$ ions in the solution and/or increases the pH of the solution) into the solution in reaction tank 18 to increase or maintain the pH of the solution. An example base injector 40A is schematically illustrated in FIG. 1. Base injector 40A may be connected to a controller and a measuring device (e.g., a pH probe) (which are not specifically illustrated in the drawing).

In some embodiments, to reach phase T1 or during phase T1, base dosing from base injector 40A is stopped while acid is being dosed to recycling path 30. This allows the pH to drop in recycling path 30 and reaction tank 18. To reach phase T2 or during phase T2, acid injector 32 is turned off and base injector 40A is turned on to bring the pH back to an operating target level. In some other embodiments, while acid injector 32 is turned on to inject an acid into recycling path 30, base injector 40A and pH control in the reaction tank remain "on" to maintain the solution in the reaction tank at a relatively constant pH.

In some embodiments, during a fines destruct phase, it may be desirable to reduce the recycling path flow rate in order to increase the recycling path retention time (e.g., to more than 30 seconds, or more than 60 seconds, or more than 90 seconds, or more than 120 seconds) and extend the amount of time the acid is acting on the fines in the recycling path before being returned to the reaction tank volume where the acid can act on both the fines and the larger crystals.

In some other embodiments, during the fines destruct phase, it may be desirable to increase the recycling path flow rate and decrease the recycling path retention time (e.g., less than 30 seconds, or less than 20 seconds, or less than 15 seconds) in some instances during the acid dose to flush out a larger portion of the fines from the reaction tank and expose the fines to the acid in the recycling path and/or to mix acid with the fluid in the reactor.

In some embodiments supersaturation for a substance being crystallized is monitored (e.g. by measuring concentrations of constituent ions optionally with other factors such as temperature that may affect supersaturation). A controller may be configured to alter the timing and/or performance of a fines destruct phase based on the measured degree of supersaturation. For example, in some embodiments the controller may be configured to perform fines destruct phases more often and/or commence a fines destruct phase when the concentration of fines reaches a lower threshold for higher supersaturation conditions as compared to lower supersaturation conditions. As another example, the target pH for a fines destruct phase and/or the duration of a fines destruct phase may be determined in part by the measured supersaturation.

Acid dosing has been demonstrated to be able to control fines accumulation and/or production in a reactor (e.g., a fluidized bed type crystallizer reactor). The acid dosing can be controlled by using a controller having an adjustable timer to set the frequency, duration and acid flow rate for the acid dose. The acid dosing can also or in the alternative be automatically controlled by using the same or a different controller based on measurements of the degree of fines accumulation in the reactor or in a portion of the reactor (e.g., turbidity measurements in the recycling path). In the further alternative, acid dosing may be initiated manually.

In cases where there are substantial amounts of non-product suspended solids in the solution (e.g., biological solids in the case of struvite crystallization in anaerobic digester liquor treatment), turbidity is not a very effective way to detect fines due to the difficulty in differentiating between fines and other particles in the recycling path (turbidity may be high even in the absence of fines). In some cases, wavelength specific detection or particle size counter/particle size analyzer could be used to differentiate fines and the "non product fines" solids if the fines have a different wavelength absorption or a distinct size distribution relative to the "non product fines" solids. In cases where the reactor feedstock solution is relatively low in foreign suspended solids content, and limited co-precipitation of these foreign suspended solids occurs, turbidity measurements have been shown to be effective for monitoring fines accumulation in the reactor.

Figure 1A:
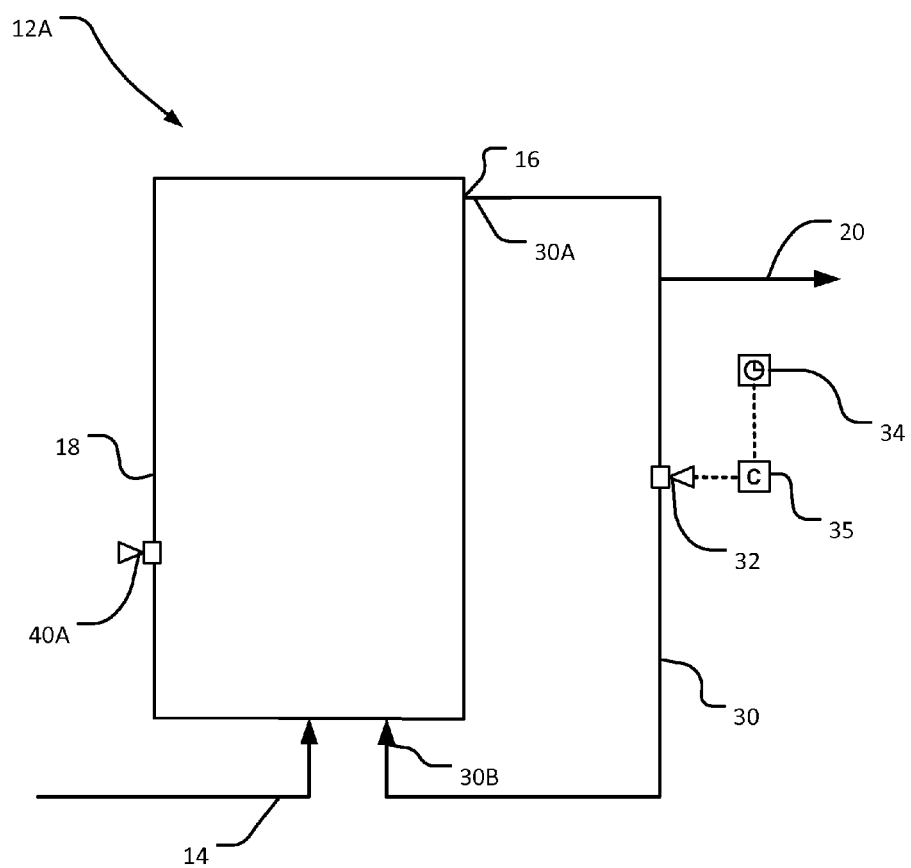

FIG. 1A shows an example reactor 12A. Reactor 12A comprises a timer 34. Timer 34 may be operatively connected to acid injector 32 via a controller 35 which controls the on/off status of acid injector 32 and the frequency, duration and acid flow rate for the acid dose.

In some embodiments, reactor 12A may have a controller that maintains supersaturation conditions in the reactor or a portion of the reactor (e.g., the reaction tank), e.g., by selectively injecting a base to increase the pH in the reactor or a portion of the reactor (e.g., the reaction tank) and/or by introducing species which take part in the crystallization reaction (e.g. Mg ions and/or ammonia in the case of struvite). That controller could use the same or different hardware from controller 35. In some embodiments, control of supersaturation is disabled during a fines destruct phase.

In a pilot scale fluidized bed crystallizer reactor with a recycling path and designed to produce about 20 kg/day of struvite crystals from wastewater containing 2000 to 10,000 mg/L $PO_4$—P, the inventors have determined that a sulfuric acid dose sufficient to dissolve 10% of the produced struvite at a dose rate of 1 mol sulfuric acid per mol struvite dissolved, delivered to the inlet end of the recycling path of the reactor for a period of 30 minutes once every 4 hours was sufficient to reduce fines production from essentially 100% of the produced struvite without the acid dosing to <5% of the produced struvite with the acid dosing.

Fines accumulation in the reactor can be measured online using a fines measuring device such as a turbidimeter, an online analyzer or a suspended solids meter, a particle counter, a particle size analyzer, a total phosphate analyzer (or analyzer for some other constituent of a substance being produced). In some embodiments, the reactor comprises a plurality of fines measuring devices. The term "online" here means through continuous measurement by an instrument immersed in or automatically sampling from the process stream (e.g., using an instrument directly mounted in/on the reactor and connected to and outputting results to the reactor control system for initiating or stopping or modifying the frequency or intensity of fines destruct cycles), as opposed to through manual sample collection and laboratory or operator analysis. The fines measuring device(s) may be positioned in the reactor above the fluidized bed or in the recycling path. For example, the fines measuring device(s) may be located at or near inlet end 30A of recycling path 30, or at or near outlet end 30B of recycling path 30, or in a mid-section of recycling path 30.

The inventors have determined that the amount of fines in the reactor recycling path can be monitored using online turbidity measurement, and that turbidity can be correlated to fines volume in the recycling path flow (ml fines per L recycling path flow), and to concentration of particulate crystal constituents (e.g., Mg, $NH_3$, $PO_4$—P). Alternatively, fines accumulation in the reactor can be measured by periodically taking offline measurements of the mass, volume, number or concentration of fines or fines components in the recycling path or elsewhere. The term "offline" here means through manual or automated sample collection for analysis in a separate laboratory or through visual observation of the sample by the operator, as opposed to using an instrument directly mounted in/on the reactor and connected to and outputting results to the reactor control system for initiating or stopping or modifying the frequency or intensity of fines destruct cycles.

Figure 1B:
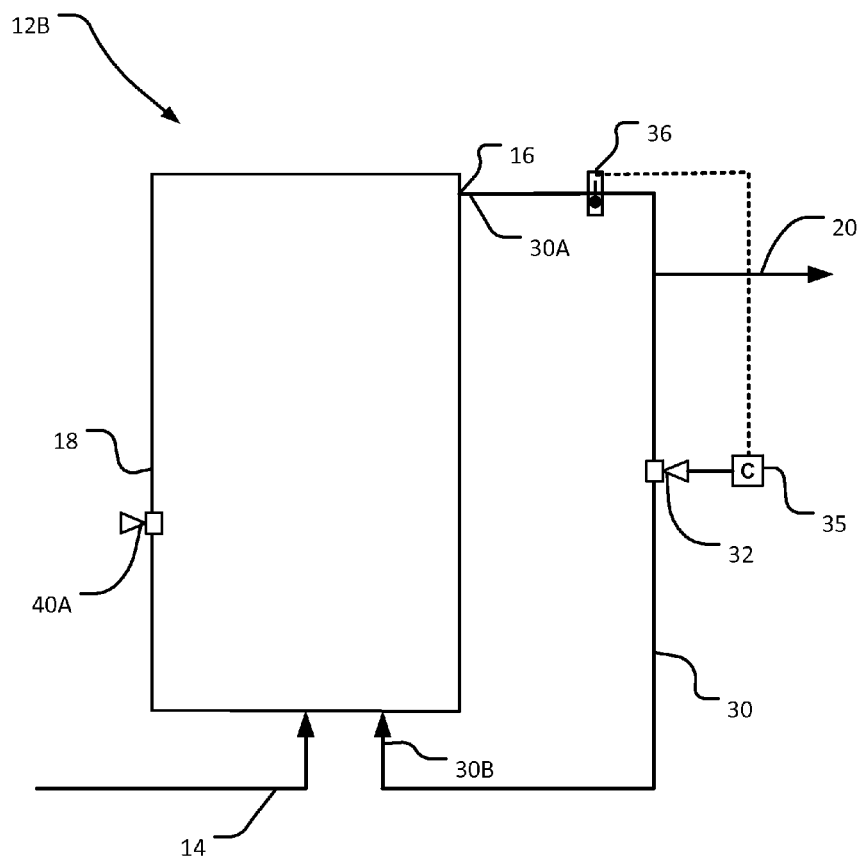

FIG. 1B shows an example reactor 12B. Reactor 12B comprises a fines measuring device 36 for measuring the accumulation of fines in the recycling path flow. Fines measuring device 36 may be operatively connected to acid injector 32 via a controller 35 which controls the on/off status of acid injector 32 and the frequency, duration and acid flow rate for the acid dose. For example, fines measuring device 36 can be used to measure the accumulation of fines in recycling path 30 online and acid injector 32 is set to initiate acid dosing only when a predetermined turbidity level is reached (e.g., 50 to 200 NTU) and to stop acid dosing once turbidity measurement has dropped below a second pre-determined level (e.g., 10 to 50 NTU). NTU stands for nephelometric turbidity units. This control mechanism proved equally successful at controlling the fines production to be <5% of the total struvite production in a pilot scale fluidized bed crystallizer reactor with a recycling path and designed to produce about 20 kg/day of struvite crystals from wastewater containing 2000 to 10,000 mg/L $PO_4$—P, but resulted in lower acid consumption as a result of only dosing the acid once fines reached a measured threshold turbidity value rather than operating on a timer that was not responsive to system conditions.

Figure 1C:
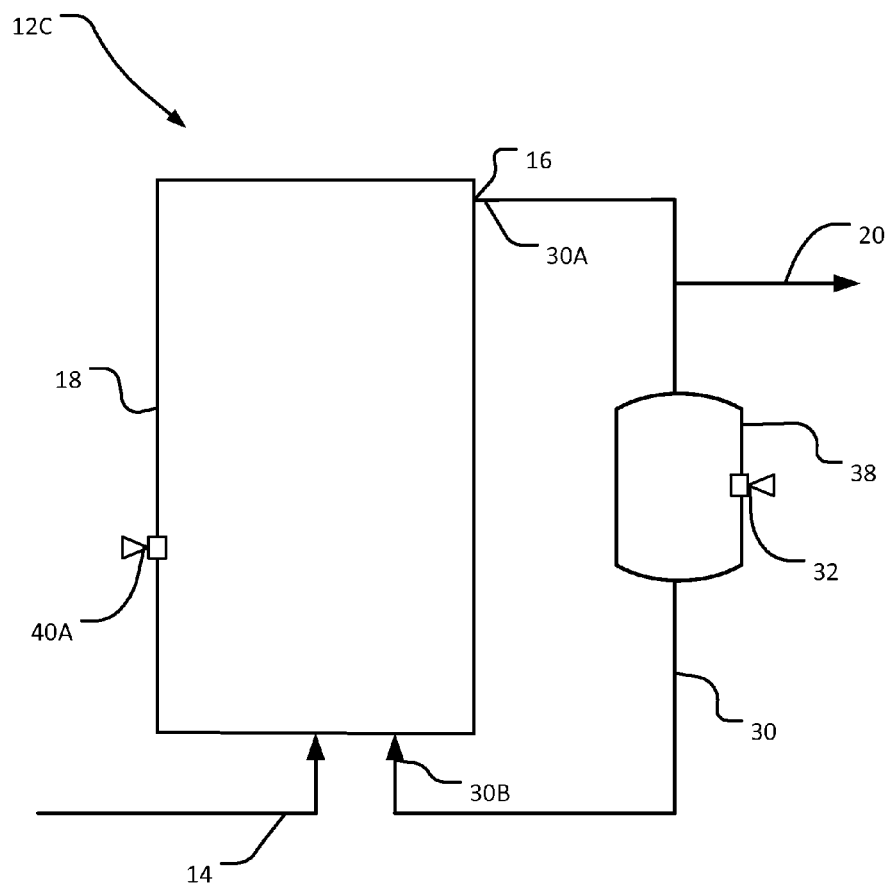

FIG. 1C shows an example reactor 12C. Recycling path 30 of reactor 12C comprises a fines treatment tank 38. Fines treatment tank 38 may have a cross-sectional area greater than the cross-sectional area of the rest of recycling path 30. Fines treatment tank 38 may be designed to have a residence time sufficient to ensure dissolution of all or substantially all of the fines contained in the recycle flow. This may involve a retention time of 30 seconds for very small fines particles (<10 µm) to up to 15 minutes for larger fines particles (10 µm to 100 µm). Fines treatment tank 38 can also be agitated using a mechanical mixer or through the use of baffles in the reaction tank to induce turbulence in the recycle flow. Tank 38 may comprise, for example, a baffled reactor tower of the same or similar height as the crystallizer reactor, the diameter of which is set to obtain the desired retention time based on expected process conditions.

Acid injector 32 may dose an acid into fines treatment tank 38 or at another point along recycling path 30. In this embodiment, after the fines in the solution has been dissolved in fines treatment tank 38, acid injector 32 or another injector can deliver a base to fines treatment tank 38 (or to the fluid in the recycle path exiting fines treatment tank 38 before or as it is being reintroduced into reactor tank 18) to increase the pH of the solution before the solution is re-introduced to reaction tank 18, so that the pH in reaction tank 18 stays relatively stable and above an equilibrium pH and large crystals in reaction tank 18 are not dissolved.

In some embodiments, fines destruction is performed in a batch mode in which a quantity of fluid is introduced into a vessel, the pH within the vessel is decreased to dissolve fines (mixing may be performed during and/or after introduction of acid to reduce the pH) and the fluid may be released from the vessel. In some embodiments, pH is raised after dissolution of the fines and before returning the fines from the vessel to the reactor. Apparatus according to some embodiments provides multiple fines destruct vessels. One or more of the vessels may be filled while fines are being dissolved in one or more of the vessels.

In some embodiments, fines may be separated from the liquor in the recycling path and concentrated through settling, filtration, centrifugation, or other solids separation techniques, and the concentrated fines solids sent to a fines treatment tank where they are dissolved in a reduced pH solution (e.g. an acidic solution) before being returned to the reactor tank and/or to the recycle path.

Figure 1D:
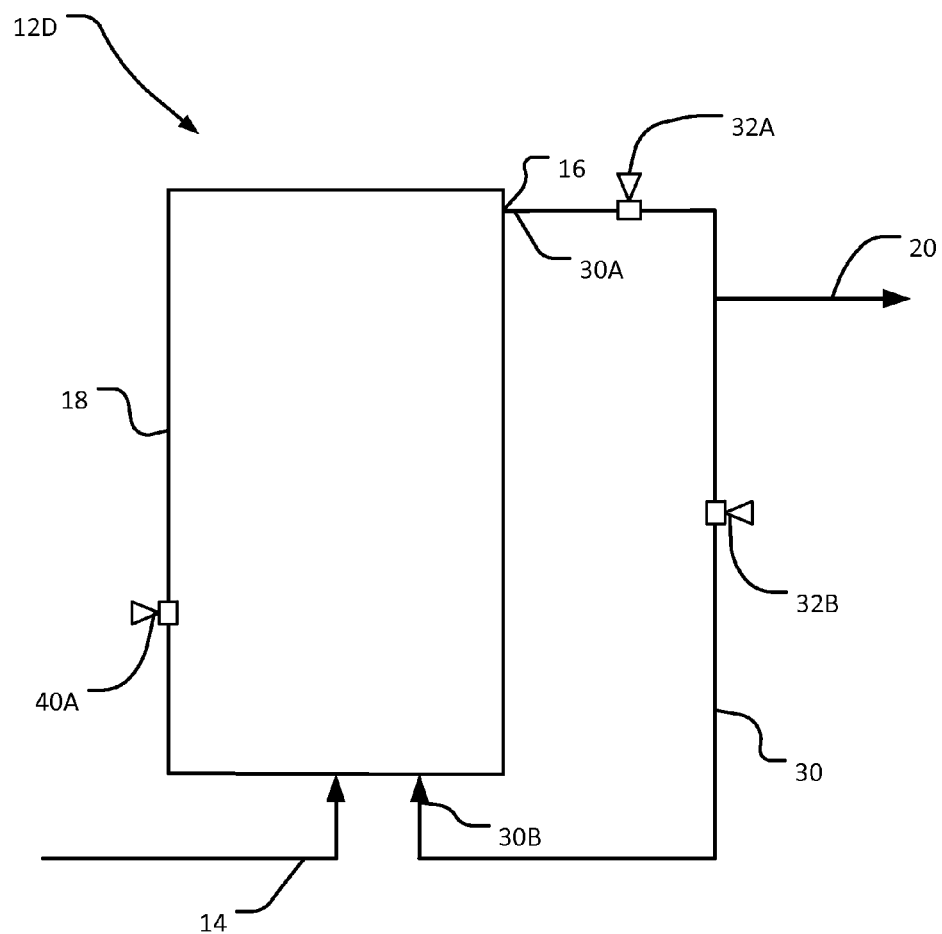
Figure 1E:
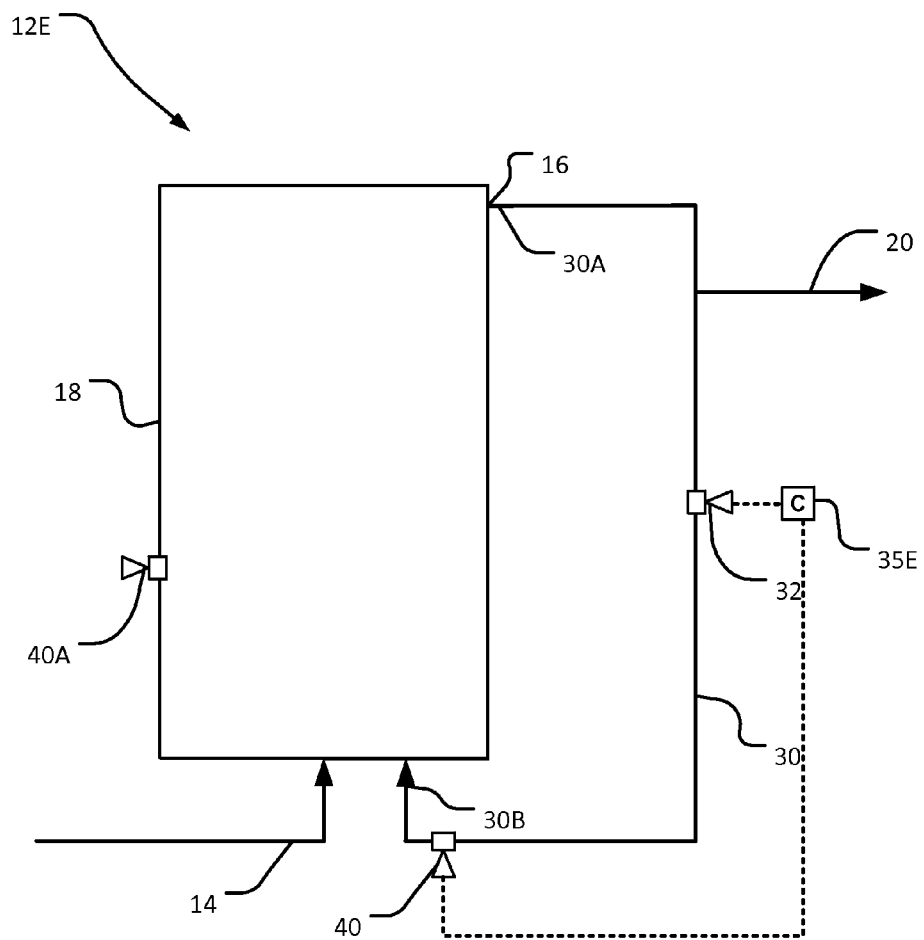
Figure 1F:
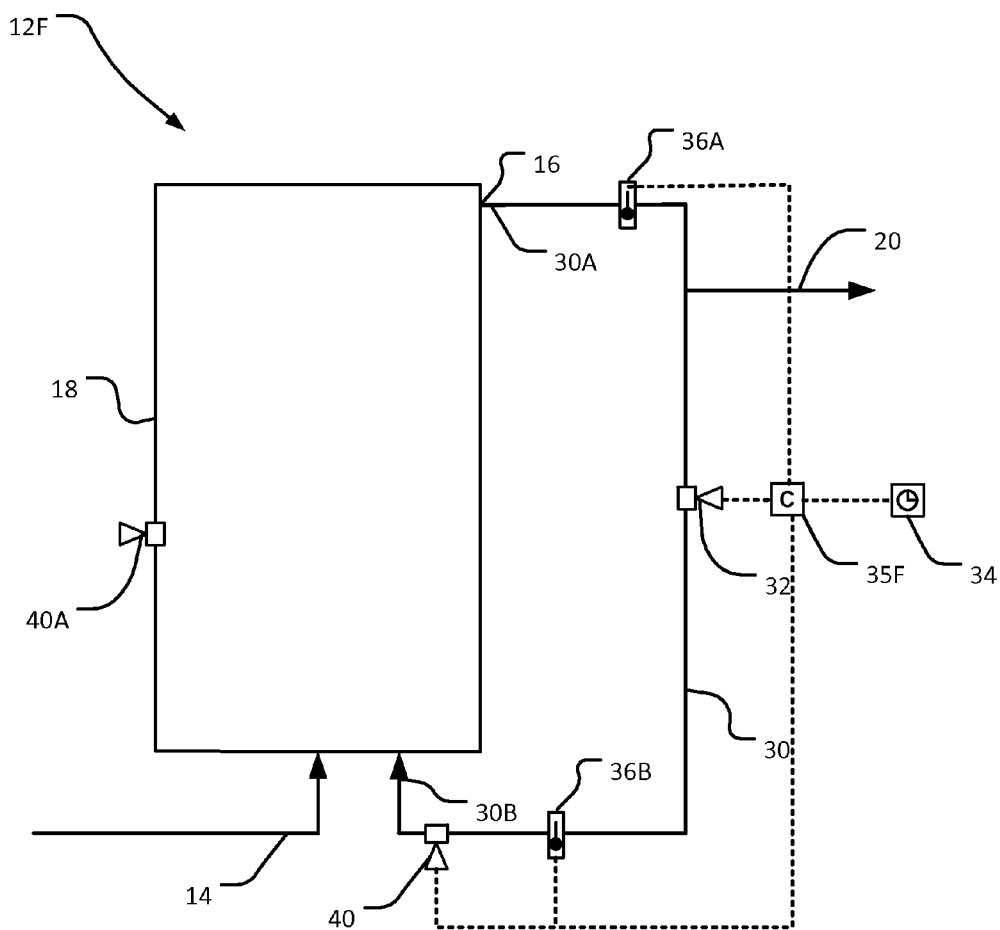
Figure 1G:
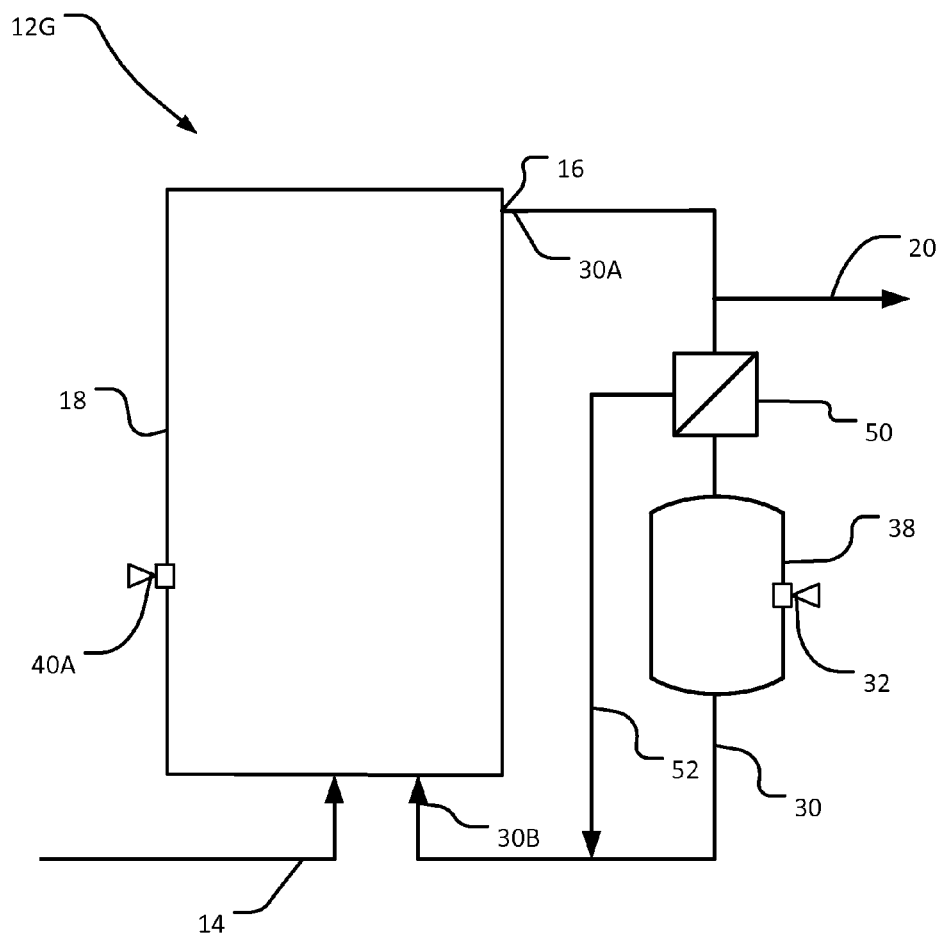

FIG. 1G shows an example reactor 12G. Recycling path 30 of reactor 12G comprises a solids separation device 50 upstream of fines treatment tank 38. Solids separation device 50 may, for example, comprise a fine filter. Separation device 50 is used to separate fines from the liquor in recycling path 30. The separated fines are sent to fines treatment tank 38 where the fines are dissolved to form a solution that is subsequently returned to reaction tank 18. Dissolving of the fines may be aided by decreasing a pH of the solution, for example by dosing an acid into fines treatment tank 38 using, for example, a suitable acid injector. Clarified liquor is sent via a bypass path 52 from separation device 50 to a point downstream of fines treatment tank 38 and is returned to reaction tank 18.

In some embodiments, the apparatus and/or method may comprise periodically changing the reaction conditions in the entire reactor, rather than a portion of the reactor (e.g., the recycling path). In some embodiments, the apparatus and/or method may comprise treating a portion of the fluid while passing through the recycling path to return the portion of the fluid to the reactor. In some embodiments, the apparatus and/or method may comprise withdrawing fines-containing fluid, treating the fines-containing fluid off-line, and returning the treated fluid to the reaction tank. In some embodiments, the apparatus and/or method may comprise taking fines treatment tank 38 off-line, removing fines in fines treatment tank 38 and returning treated fluid back into reaction tank 18 either on its own or mixed with other fluid (e.g. a recycle flow and/or incoming feed stock).

In some embodiments, a crystallization reactor comprises a plurality of acid injectors. The plurality of acid injectors may be located at one or more points along the recycling path and/or in the reaction tank. For example, in some embodiments, one or more acid injectors may be located in the reaction tank, above the top of the fluidized bed to take advantage of the reaction tank volume/retention time above the fluidized bed for fines destruction. An example is schematically illustrated in FIG. 1D. In FIG. 1D, reactor 12D comprises a first acid injector 32A near the inlet end of recycling path 30 and a second acid injector 32B at a mid-section of recycling path 30.

In some embodiments, a crystallization reactor comprises one or more base injectors. For example, one of the base injectors may be located at or near the outlet end of the recycling path (e.g., at or near a point before the recycling path returns the recycled solution into the reaction tank). The base injector may be used to dose a base to the solution to increase the pH of the solution before the solution returns to the reaction tank, or may inject a base into one or more points within the reaction tank, or through a manifold into the reaction tank in order to introduce the base into the liquor in the reaction tank in a diffuse way in order to avoid locally high concentrations of the base and locally high pH in the area around the point of base addition. The base injector may dose a base (alkaline) solution such as sodium hydroxide (NaOH), magnesium hydroxide ($Mg(OH)_2$), ammonium hydroxide ($NH_4OH$) or the like to increase the pH of the solution and to promote crystal formation and growth in the reaction tank (e.g., by increasing the pH of the solution to a level above an equilibrium pH). In some embodiments the injected base comprises chemical species that are also part of the precipitated substance (e.g. ammonium ions in the case of struvite).

The base injector may be connected to and controlled by a controller. The controller may control the on/off status of the base injector and the frequency, duration and flow rate for the base dose. The controller may be connected to a timer and/or a measuring device (e.g., a pH probe, turbidity meter etc.). The controller may be the same or different from the controller that controls the acid injector(s).

An example reactor is schematically illustrated in FIG. 1E. In FIG. 1E, reactor 12E comprises not only base injector 40A, but also a base injector 40. Base injector 40 is downstream of acid injector 32 along recycling path 30. Base injector 40 is connected to and controlled by a controller 35E which may also control acid injector 32. In other embodiments, the controllers for the base injector and the acid injector may be separate and/or interrelated controllers. In some embodiments, the base injector is automatically shut off when the reactor is in an acid injection mode.

FIG. 1F schematically illustrates another example reactor 12F. Reactor 12F comprises two measuring devices 36A, 36B, one located near inlet end 30A of recycling path 30, the other located near outlet end 30B of recycling path 30. Reactor 12F may comprise additional measuring devices which are not specifically shown in the drawing (e.g., one or more measuring devices in reaction tank 18). Reactor 12F comprises an acid injector 32 and a base injector 40. Reactor 12F comprises a timer 34.

All of components 36A, 36B, 32, 40 and 34 are operatively connected to a controller 35F which controls the operations of both acid injector 32 and base injector 40. Controller 35F may be switched between operating under timer 34 or operating based on fines and/or pH measurements by measuring devices 36A, 36B. Measuring devices 36A, 36B may be fines measuring devices, or pH measuring devices, or a combination thereof.

Figure 1H:
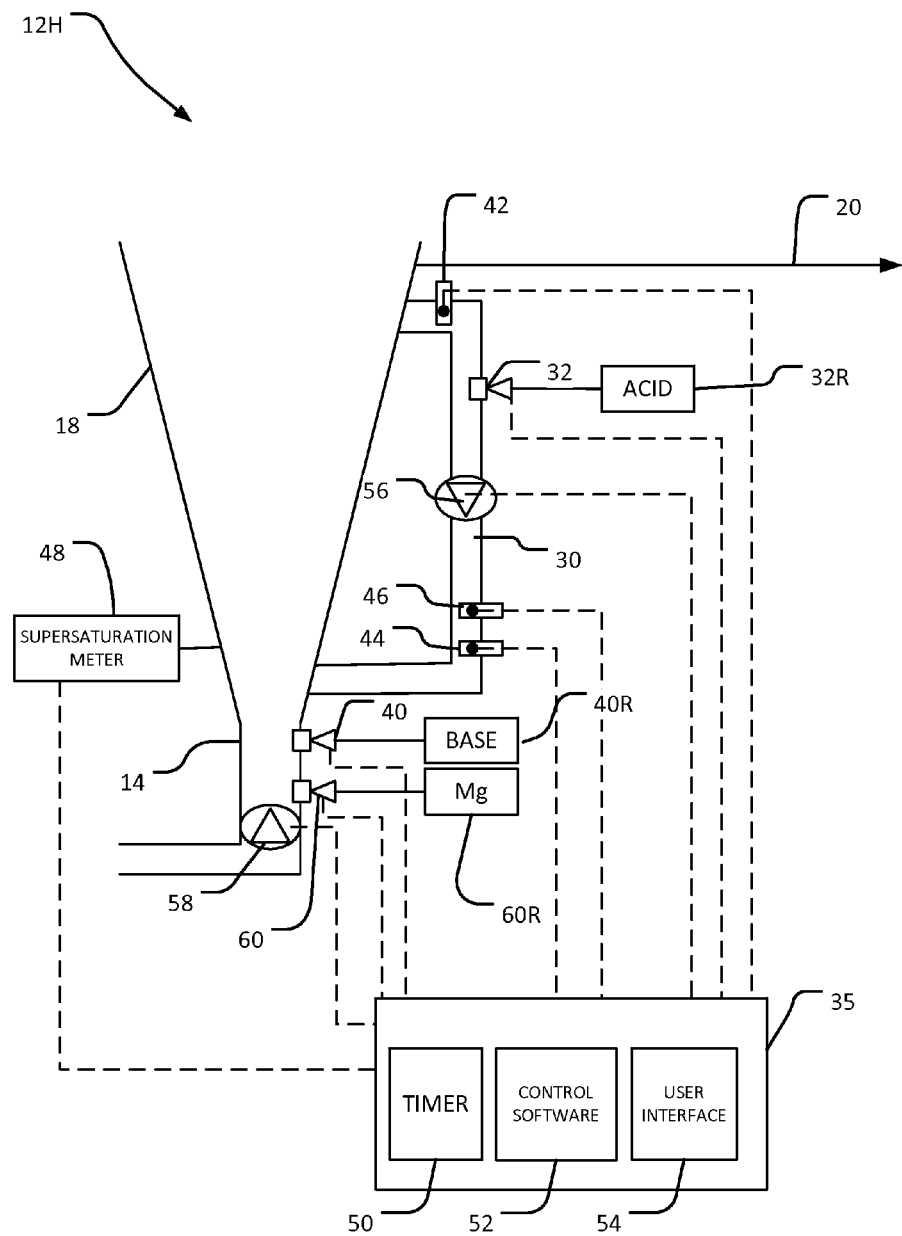

FIG. 1H schematically illustrates another example reactor 12H. Reactor 12H comprises reaction tank 18 and recycling path 30. Reactor 12H also comprises effluent piping system 20. Reactor 12H comprises acid injector 32 which is located and configured for injecting an acid into solution flow in recycling path 30. Acid injector 32 is connected to an acid reservoir 32R. Reactor 12H also comprises a base injector 40 which is connected to a base reservoir 40R and a $Mg^{2+}$ injector 60 which is connected to a $Mg^{2+}$ substance reservoir 60R. Reactor 12H also comprises a plurality of measuring devices, including a pH measuring device 42 located at an upstream portion of recycling path 30 (e.g., upstream of acid injector 32), another pH measuring device 44 located at an downstream portion of recycling path 30 (e.g., downstream of acid injector 32), a turbidity measuring device 46, and a supersaturation meter 48 which is configured to measure the supersaturation level in reaction tank 18. Reactor 12H comprises valves, for example, a valve 56 located in recycling path, and a valve 58 located at or near inlet 14 to reaction tank 18. Components 32, 40, 42, 44, 46, 48, 58, 60 may be connected and/or controlled by a controller 35. Controller 35 may comprise a timer 50, control software 52, and user interface 54.

One aspect of the invention relates to methods for the control of fines in a crystallization reactor. In some embodiments the crystallization reactor is a fluidized bed reactor. The methods are particularly advantageous when applied to crystallization of substances that are sparingly soluble and have a solubility that is pH dependent. Sparingly soluble materials have Ksp of less than about $1 \times 10^{-5}$. In some embodiments the methods described herein are applied to yield crystals of substances that are sparingly soluble. In some embodiments the substances have Ksp not exceeding about $1 \times 10^{-7}$.

In some embodiments, the substance has a Ksp of less than or equal to $2.5 \times 10^{-13}$, less than or equal to $1.5 \times 10^{-13}$ in some embodiments or less than or equal to $1 \times 10^{-14}$ in some embodiments. In some embodiments the crystallized substances comprise struvite, magnesium ammonium phosphate, struvite analogs, or calcium phosphate (hydroxylapatite).

Figure 4:
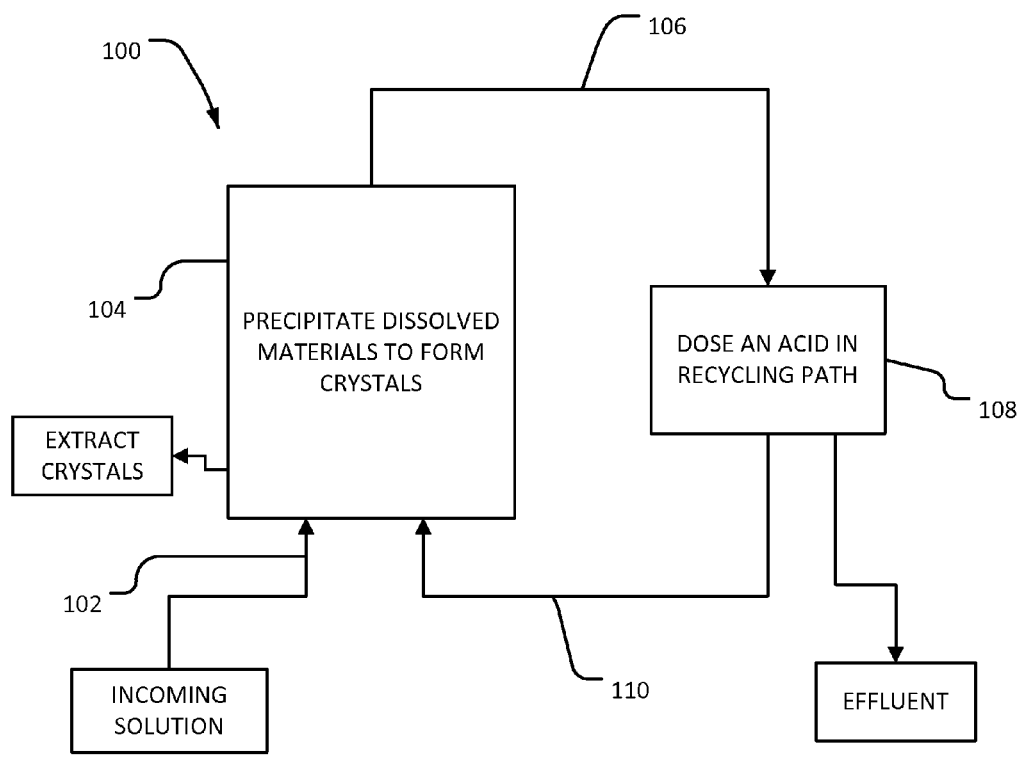
FIG. 4 is a flow chart which schematically illustrates a method according to an example embodiment of the invention.

FIG. 4 schematically illustrates a method 100 according to an example embodiment of the invention. Method 100 comprises step 102 of introducing a solution (e.g., wastewater in some embodiments) into a reaction tank, and step 104 of precipitating dissolved materials from the solution to form crystals in the reaction tank. Method 100 comprises step 106 of passing a portion of the solution from the reaction tank through a recycling path, step 108 of dosing an acid to the solution in the recycling path, and step 110 of returning at least a portion of the recycled solution back into the reaction tank. In some alternative embodiments, the method may comprise dosing an acid directly into the solution in the reaction tank.

In some embodiments, in step 104, the pH of the solution in the reaction tank is maintained between 6.0 and 9 (e.g., between 7.0 to 8.5). In other embodiments, in step 104, the pH of the solution in the reaction tank is maintained above 7, or above 7.5, or above 8.0, or above 8.3. In some embodiments controlling the pH of the solution in the reaction tank comprises introducing a base into the reaction tank or at a point upstream of the reaction tank or at a point at or near the outlet end of the recycling path or within the reaction tank via one or more base injectors. The base may comprise sodium hydroxide (NaOH), magnesium hydroxide (Mg(OH)$_2$), ammonium hydroxide (NH$_4$OH) or the like.

In some embodiments, in step 108, the acid introduced into the recycling path may comprise sulfuric acid, acetic acid, hydrochloric acid, phosphoric acid, nitric acid, citric acid, or some other suitable acid.

In one embodiment, the acid comprises sulfuric acid. For example, the acid may be 93%-98% sulfuric acid. Sulfuric acid is readily available at wet process phosphoric acid plants and thus is convenient to use when operating this method at a wet process phosphoric acid plant.

In another embodiment, the acid comprises acetic acid (or other volatile fatty acid or blend of volatile fatty acids), which is useful as a source of volatile fatty acids required for the uptake of phosphate from wastewater in treatment plants using enhanced biological phosphorus removal. Therefore, applying acetic acid or volatile fatty acids to the wastewater in the recycling path creates an additional level of synergy.

In some situations, particularly in industrial processes with zero or limited liquid discharge, the use of hydrochloric acid should be avoided because hydrochloric acid could cause corrosion problems in downstream equipment due to the accumulation of chlorides in the system.

In an alternative embodiment, carbon dioxide gas instead of an acid solution may be introduced into the wastewater in the recycling path to reduce the pH of the wastewater through the formation of carbonic acid. Some such embodiments may comprise performing air stripping (either in the recycling path or in a separate path) and/or bubbling air through tank 18 to assist in raising the pH at the end of a fines destruct phase.

In some embodiments, in step 108, the acid is dosed to the solution in the recycling path to reduce the pH of the solution in the reactor or the reactor recycling path by 0.05 to 1 pH units. For example, the acid may be dosed to the solution in the recycling path to reduce the pH of the solution in the reactor or the reactor recycling path by 0.10 pH units to 0.50 pH units.

In some embodiments, the acid is dosed to the solution in the recycling path rapidly so as to reduce the pH of the solution in the reactor or the reactor recycling path by 0.20 to 0.50 pH units within less than 5 minutes, or less than 1 minutes, or less than 30 seconds, or less than 20 seconds, or less than 10 seconds, or less than 5 seconds.

In some embodiments, in step 108, the acid is introduced into the recycling path periodically. For example, a timer and a controller may be used to control the period of time that the acid is dosed into the recycling path and the interval between acid doses. For example, the acid may be dosed, either continuously or in pulses, for a period of time (e.g., a period of time corresponding to 1 to 5 times the fluid retention time in the reactor), and then acid dosing is off for an interval (e.g., a fixed interval or an interval short enough that fines won't get out of control) before starting the next round of acid dosing. In some embodiments, acid dosing is on for a period of 5 to 45 minutes and off for a period of 15 minutes to 24 hours. In some embodiments the time between fines destruct phases in which pH is reduced is on the order of 10 hours (e.g. 2 to 30 hours). In one particular example embodiment, acid dosing is applied to reduce pH for a period of 30 minutes and off for a period of 3.5 hours. In some embodiments, after the period of acid dosing is over, a base is introduced into the recycling path or the reaction tank to increase and/or maintain the pH of the solution in the reaction tank to a level suitable for crystal formation and growth.

In some embodiments, step 108 comprises measuring the concentration of fines in the reactor or in the reactor recycling path. Step 108 may comprise turning on acid dosing when the measurement of the concentration of fines in the reactor or in the reactor recycling path is equal to or above a pre-determined first threshold value, and turning off acid dosing when the measurement of the concentration of fines in the reactor or in the reactor recycling path is equal to or below a pre-determined second threshold value. The first threshold value may for example be a turbidity value in the range of 50-500 NTU or 50-200 NTU. The second threshold value may be a turbidity value in the range of 10-50 NTU or 20-100 NTU. Method 100 may comprise controlling the concentration of fines in the reactor or in the reactor recycling path in a desired range, for example, controlling the turbidity within a range of 500 NTU, or a range with a low value of 10-100 NTU and a high value of 50-500 NTU.

In some embodiments, fines in the reactor or the reactor recycling path are allowed to accumulate to a level equivalent to less than or up to 5 mL of settleable fines in an Imhoff cone per L of the solution in the recycling path before starting an acid dosing cycle.

In some embodiments, the acid is dosed directly to the reaction tank of the reactor. This may result in the preferential dissolution of the smaller crystals in the reactor.

Periodically, or continuously, crystals (e.g. crystals of struvite or struvite analogs or phosphate compounds) are extracted from the reaction tank. The crystals may be extracted from a harvesting section of the reaction tank. In some embodiments valves or the like are provided to permit the harvesting section to be isolated from the rest of the reaction tank while crystals are removed from the harvesting section. In some embodiments, larger crystals are removed on a more or less continuous basis using for example an elutriation leg.

In some embodiments, to avoid an increase of discharge of phosphorus in the effluent, the effluent discharge of the effluent piping system may be temporarily turned off or reduced and the introduction of the feedstock solution into the reaction tank may be temporarily discontinued or reduced during an acid dosing phase. In some embodiments, a plurality of reactors are provided. While one reactor is undergoing a fines destruct phase feedstock may be partly or entirely diverted to one or more other reactors. The reactors may have their fines destruct phases staggered so that one or more of the reactors is always available to accept feedstock. Alternatively, the effluent discharge may be collected into a separate collection tank during an acid dosing phase and then recycled through the reaction tank when acid dosing is over.

Figure 4A:
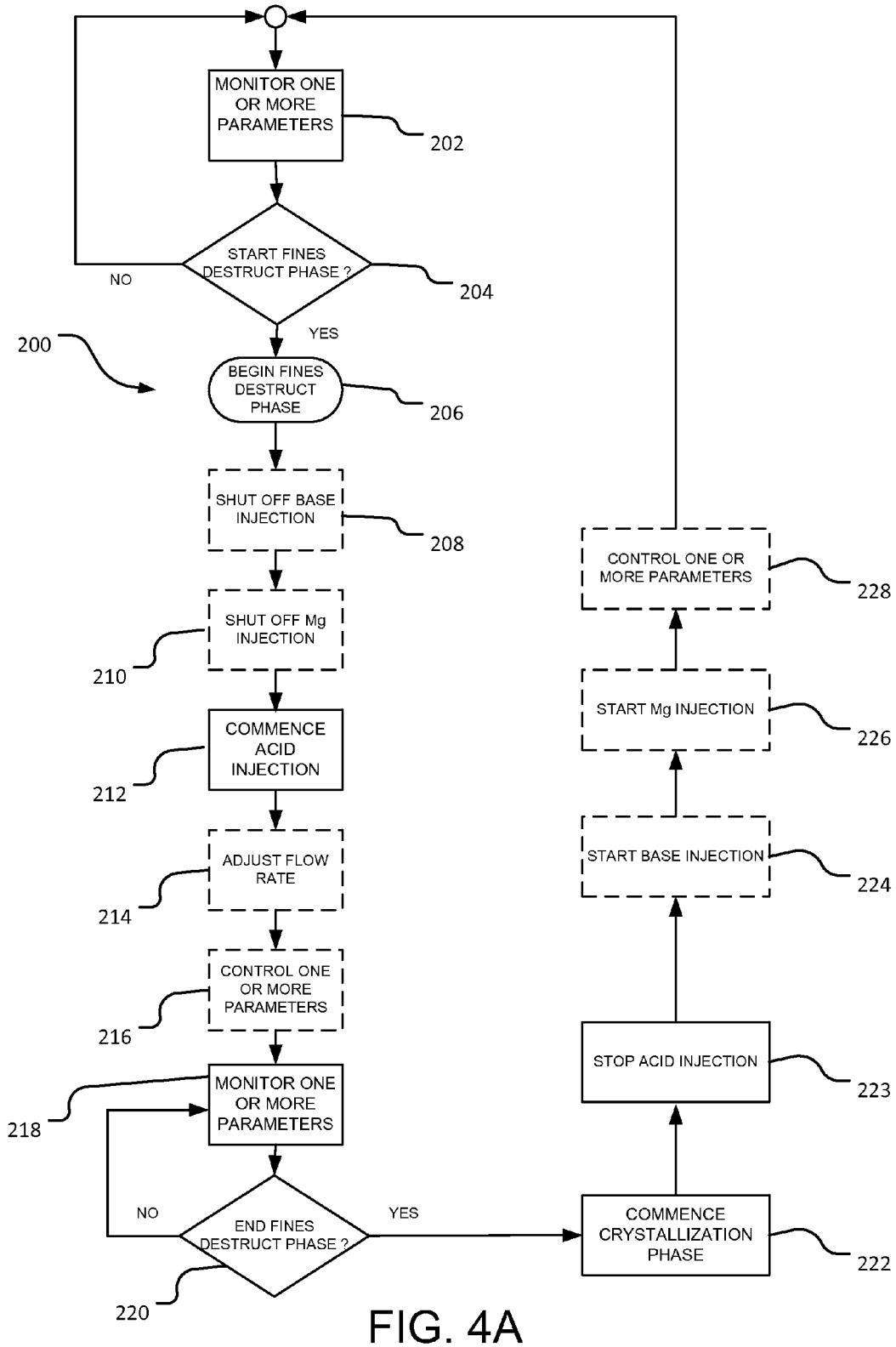
FIG. 4A is a flow chart which schematically illustrates a method according to another example embodiment of the invention.

FIG. 4A schematically illustrates a method 200 according to an example embodiment of the invention. Method 100 comprises step 202 of monitoring one or more parameters of the solution in the reactor or in a portion of the reactor (e.g., a recycling path). The one or more parameters monitored may comprise, for example, time, turbidity of the solution, pH, supersaturation level, temperature, etc.

Step 202 is followed by step 204 of querying whether to start fines destruct phase. Step 204 may comprise, for example, determining whether a certain time has passed since the last fines destruct phase and/or determining whether a concentration of fines in the solution has reached a threshold (as indicated, for example by turbidity or for example based on measurements of suspended solids, particle counter, particle size analyzer, analysis of suspended constituents of the liquor using an online total phosphate analyzer, or offline measurement of similar parameters). If the answer in step 204 is NO, the method returns to step 202. If the answer is YES, the method proceeds to step 206 which initiates the fines destruct phase. Method 200 may optionally comprise step 208 of shutting off base injection into the reactor or in a portion of the reactor, and step 210 of shutting off $Mg^{2+}$ injection into the reactor or in a portion of the reactor.

Method 200 comprises step 212 of commencing acid injection into the reactor or in a portion of the reactor. Method 200 may optionally comprise step 214 of adjusting flow rate in the reactor or in a portion of the reactor (either adjusting flow rate downward to allow more time for fines to be dissolved in a recycle path or adjusting flow rate upward to speed mixing of acid with the fluid in the reactor and/or to increase the proportion of fines from the reaction tank that are taken through a recycle path in a given period), and step 216 of controlling one or more parameters of the solution in the reactor or in a portion of the reactor. The one or more parameters may comprise, for example, time, turbidity of the solution, pH, supersaturation level, temperature, etc.

Method 200 comprises step 218 of monitoring one or more parameters of the solution in the reactor or in a portion of the reactor. This is followed by step 220 of querying whether to end fines destruct phase. Step 220 may comprise, for example one or a combination of: determining that a certain period of time has elapsed since initiation of the fines destruct phase and/or determining that pH at one or more points in the reactor has reached a specified threshold and/or has changed by a threshold amount since inception of the fines destruct phase and/or determining that a turbidity or other measure of fines concentration has fallen to or below a threshold.

If the answer at step 220 is NO, the method returns to step 218. If the answer is YES, method 200 proceeds to step 222 of beginning the crystallization phase, beginning with step 223 of shutting off acid injection. Method 200 may optionally comprise step 224 of starting base injection, step 226 of starting $Mg^{2+}$ injection, and step 228 of controlling one or more parameters (for example, time, turbidity of the solution, pH, supersaturation level, temperature, etc.). Method 200 then returns to step 202.

Methods and apparatus according to any embodiments disclosed herein may perform additional steps and/or have additional components to assist in destruction of fines. For example, in some embodiments where a substance being crystallized has a solubility that increases with temperature, pH-reduced fluid may be heated to facilitate rapid dissolution of fines. As another example, fluid may be agitated to facilitate rapid dissolution of fines. For example, some embodiments may comprise heaters that heat fluid flowing in recycle paths and/or inline mixers, agitators, stirrers, or the like.

A jar test was conducted to evaluate the effectiveness of reducing pH for destroying struvite fines. An objective of the jar test was to determine the relationship between mixing energy and efficiency of acid destruction of struvite fines; and to gain insight into the most cost effective and feasible way of performing acid destruction at full scale application(s).

Materials and Experiment Apparatus
Sample: Pilot Reactor (Pearl® 20) recycle line fluid—10 Liters
Acid: 93% H2SO4—50 mL
(1×) 1 L beaker
(1×) Stir plate and stir bar
(1×) pH meter
(1×) turbidity meter
(1×) 6-station jar test apparatus
Pipetters & tips: (1×) 100-1000 μmL and (1×) 1-10 mL
(1×) Stop watch Methods
Acid Titration Test—To Determine Acid Usage
Procedures:
1. Measure 1 L of sample and pour into the 1 L beaker
2. Analyze and record initial pH and turbidity values
3. Place the beaker onto the stir plate, put in the stir bar and start stirring. Note: use medium mixing speed: enough to stir up all the settlements but not too vigorous
4. Add 93% $H_2SO_4$ (use pipetter) into the beaker in 0.1 mL increments and record end pHs and turbidities (if necessary) after each shot
5. Stop adding more acid when turbidity drops to below 10 NTU—which is the end of titration
6. Record final pH, turbidity and total usage of acid (V)

Mixing Energy Test—To Study the Relationship Between Mixing Energy and Fines Destruction Efficiency
Procedures:
1. Measure 1.5 L of sample and pour into one of the 6 Jars from the jar test apparatus
2. Turn on the mixer and adjust the speed to be 60 RPM
3. Turn off the mixer and wait for the liquid to stop moving
4. Measure (1.5*V) of 93% $H_2SO_4$ and add into the same jar all at once
5. Start the mixer immediately after acid is added and start timer at the same time
6. Use the 1-10 mL pipetter to take samples for turbidity tests—every 30 sec (if possible). Record sample time and turbidity. Note: (1) the pipetter tip needs to be modified (i.e. enlarged) prior to the test—in order to be able to pick up larger flocs, (2) turbidity tests have to be performed right away, (3) do not pour samples back to the jar.
7. Repeat steps 1 to 6 for mixing speeds of 150 RPM, 225 RPM, and 300 RPM.

Figure 5:
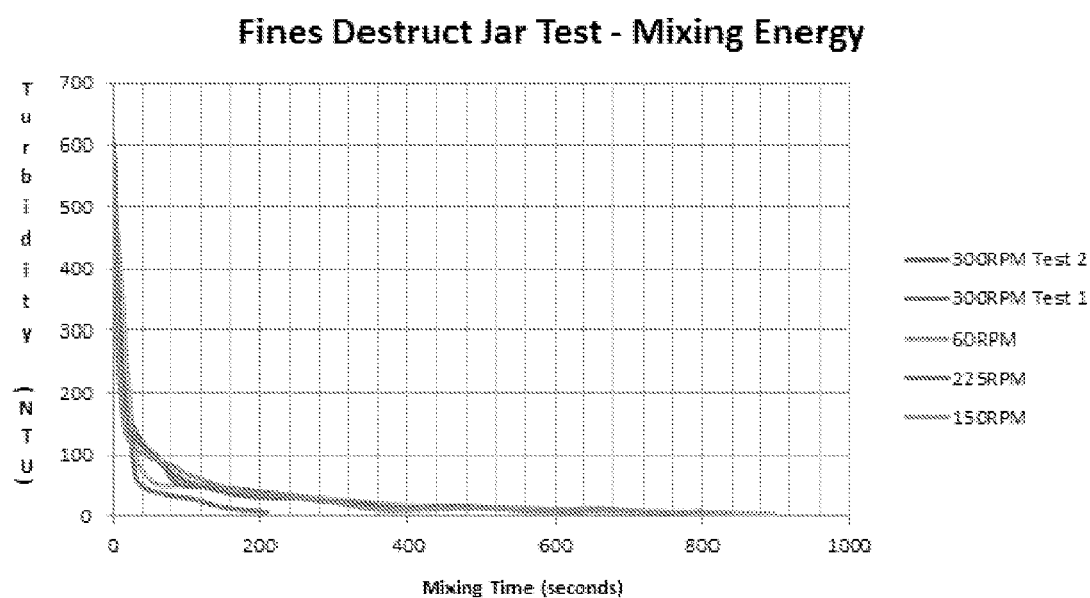
FIG. 5 is a graph showing turbidity as a function of mixing time in some example jar tests.

Results
A graph showing turbidity as a function of mixing time in the jar tests is presented in FIG. 5.
Below are observations and findings of the Jar Tests:
1. Due to the presence of polymer(s), flocs were formed in jars under lower mixing speeds (60 RPM and 150 RPM)—the lower the mixing speed, the larger the flocs.
2. Different mixing speeds/energies did not make any noticeable difference to the fines destruction efficiency.
3. A majority (about 80%-85%) of the fines were destroyed within the first 30 seconds.
4. Over 90% of the fines were destroyed within the first 2 minutes.
5. The last 10% of fines took a long time (over 10 minutes) to dissolve.

The jar test results suggest that it is desirable to ensure enough mixing of the acid in the recycling path (or in another location where acid is injected)—to mix acid well with recycle liquid. Generally, the turbulence induced by fittings in the recycle path such as various elbows and tees may be sufficient to ensure sufficient mixing of the acid in most cases especially where the fluid flowing in the recycle path has a reasonably high flow velocity. A recycling path having a volume sufficient to provide a retention time of about 30 sec would appear to be a cost effective size based on the jar tests.

Methods and apparatus described herein may be used in combination with methods and apparatus described in Koch et al., U.S. Pat. No. 7,622,047, which is hereby incorporated herein by reference. For example, reaction tank 18 may be configured as described by Koch et al.

Methods and apparatus described herein may also be used in combination with methods and apparatus described in one or more of US2012/0031849 entitled "AERATED REAC- TOR APPARATUS AND METHODS", US2012/0261334 entitled "METHODS AND APPARATUS FOR STRUVITE RECOVERY USING UPSTREAM CO2 INJECTION", US2012/0261338 entitled "METHODS AND APPARATUS FOR STRUVITE RECOVERY USING UPSTREAM PHOSPHATE INJECTION", and US2013/0062289 entitled "TREATMENT OF PHOSPHATE-CONTAINING WASTEWATER", all of which are hereby incorporated herein by reference.

While examples described herein relate to cases in which solubility of a substance being crystallized is increased at lower pH and decreased at higher pH, the principles described herein may be applied to crystallization of substances in which solubility of a substance being crystallized is increased at higher pH and decreased at lower pH by replacing injection of acids with injection of bases so that the pH is increased during a fines destruct phase and/or in a fines destruct zone.

INTERPRETATION OF TERMS

Unless the context clearly requires otherwise, throughout the description and the claims:

"comprise," "comprising," and the like are to be construed in an inclusive sense, as opposed to an exclusive or exhaustive sense; that is to say, in the sense of "including, but not limited to".

"connected," "coupled," or any variant thereof, means any connection or coupling, either direct or indirect, between two or more elements; the coupling or connection between the elements can be physical, logical, or a combination thereof.

"herein," "above," "below," and words of similar import, when used to describe this specification shall refer to this specification as a whole and not to any particular portions of this specification.

"or," in reference to a list of two or more items, covers all of the following interpretations of the word: any of the items in the list, all of the items in the list, and any combination of the items in the list.

the singular forms "a", "an" and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component (e.g. a tank, conduit, injector, pump, controller, processor, assembly, device, valve, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole.

What is claimed is:

1. A method for precipitating dissolved materials from a solution, the method comprising:
   (a) introducing the solution containing the dissolved materials into a reactor,
   (b) causing the dissolved materials in the solution to precipitate into crystals under first reaction conditions,
   (c) adjusting the reaction condition in the reactor or in a portion of the reactor from the first reaction conditions to second reaction conditions,
   (d) maintaining the second reaction conditions in the reactor or in a portion of the reactor for a period of time sufficient to cause a sub-population of the crystals to dissolve,
   (e) adjusting the reaction condition in the reactor or in a portion of the reactor from the second reaction conditions to the first reaction conditions.

2. The method according to claim 1, wherein the first reaction condition is a reaction condition wherein the rate of dissolved materials in the solution precipitating into crystals (Rforward) is greater than the rate of crystals dissolving into solution (Rreverse), and wherein the second reaction condition is a reaction condition wherein the rate of dissolved materials in the solution precipitating into crystals (Rforward) is less than the rate of crystals dissolving into solution (Rreverse).

3. The method according to claim 1, wherein steps (b) to (e) are repeated in cycles.

4. The method according to claim 1, wherein step (c) comprises decreasing the pH of the solution in the reactor or in a portion of the reactor to below an equilibrium pH.

5. The method according to claim 4, wherein decreasing the pH of the solution in the reactor or in a portion of the reactor to below an equilibrium pH in step (c) comprises dosing an acid into the solution.

6. The method according to claim 5, wherein the acid comprises one or more of sulfuric acid, nitric acid, phosphoric acid, acetic acid, hydrochloric acid, citric acid and carbon dioxide.

7. The method according to claim 5, wherein the acid is dosed to a recycling path of the reactor.

8. The method according to claim 1, wherein step (c) comprises decreasing the pH of the solution in the reactor or in a portion of the reactor by 0.05 to 1 pH units from the first reaction condition to the second reaction condition.

9. The method according to claim 1, wherein step (c) comprises decreasing the pH of the solution in the reactor or in a portion of the reactor by 0.1 to 0.5 pH units from the first reaction condition to the second reaction condition.

10. The method according to claim 9, wherein step (c) comprises decreasing the pH of the solution in the reactor or in a portion of the reactor by 0.2 to 0.5 pH units from the first reaction condition to the second reaction condition within 5 to 30 minutes.

11. The method according to claim 9, wherein step (c) comprises decreasing the pH of the solution in the reactor or in a portion of the reactor by 0.2 to 0.5 pH units within less than 5 minutes.

12. The method according to claim 11, wherein step (c) comprises decreasing the pH of the solution in the reactor or in a portion of the reactor by 0.2 to 0.5 pH units within less than 30 seconds.

13. The method according to claim 1, wherein step (c) comprises decreasing the pH of the solution in the reactor or in a portion of the reactor to a level which is sufficient to increase the solubility of the crystals by at least 10%.

14. The method according to claim 13, wherein step (c) comprises decreasing the pH of the solution in the reactor or in a portion of the reactor to a level which is sufficient to increase the solubility of the crystals by at least 50%.

15. The method according to claim 1, wherein step (e) comprises increasing the pH of the solution to above an equilibrium pH.

16. The method according to claim 15, wherein increasing the pH of the solution to above an equilibrium pH in step (e) comprises dosing a base to the solution.

17. The method according to claim 1, wherein the reaction condition is switched between the first reaction condition and the second reaction condition automatically based on a timer.

18. The method according to claim 1, wherein the reaction condition is switched between the first reaction condition and the second reaction condition automatically based on an online or offline measurement of a parameter of the solution in the reactor or in a portion of the reactor.

19. The method according to claim 18, wherein the parameter measured is turbidity.

20. The method according to claim 19, wherein the reaction condition is automatically switched from the first reaction condition to the second reaction condition when the measured turbidity increases to a level between 50 to 200 NTU, and wherein the reaction condition is automatically switched from the second reaction condition to the first reaction condition when the measured turbidity decreases to a level below 50 NTU.

21. The method according to claim 1, wherein the sub-population of the crystals dissolved in step (d) comprise fine crystals having a diameter of less than 100 microns.

* * * * *